(12) United States Patent
Inagaki et al.

(10) Patent No.: US 11,500,266 B2
(45) Date of Patent: Nov. 15, 2022

(54) LENS APPARATUS AND CALCULATION METHOD

(71) Applicant: CANON KABUSHIKI KAISHA, Tokyo (JP)

(72) Inventors: Yu Inagaki, Kawasaki (JP); Nobutaka Mizuno, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 342 days.

(21) Appl. No.: 16/451,842

(22) Filed: Jun. 25, 2019

(65) Prior Publication Data

US 2020/0004109 A1  Jan. 2, 2020

(30) Foreign Application Priority Data

Jun. 29, 2018  (JP) .............................. JP2018-125508

(51) Int. Cl.
*G03B 7/20* (2021.01)
*G03B 17/14* (2021.01)
*H04N 5/225* (2006.01)

(52) U.S. Cl.
CPC ............... *G03B 7/20* (2013.01); *G03B 17/14* (2013.01); *H04N 5/2254* (2013.01)

(58) Field of Classification Search
CPC .......... G03B 7/20; G03B 17/14; G03B 13/36; H04N 5/2254; H04N 5/3696; H04N 5/232122
See application file for complete search history.

(56) References Cited

U.S. PATENT DOCUMENTS

| | | | |
|---|---|---|---|
| 9,729,777 B2 * | 8/2017 | Ito | G02B 7/34 |
| 2014/0072290 A1 * | 3/2014 | Miyatani | G03B 13/36 |
| | | | 396/104 |
| 2014/0253786 A1 * | 9/2014 | Ogawa | H04N 5/232122 |
| | | | 348/349 |
| 2018/0180840 A1 * | 6/2018 | Wada | G02B 5/208 |
| 2019/0278052 A1 * | 9/2019 | Kikuchi | H04N 5/232122 |

FOREIGN PATENT DOCUMENTS

| | | |
|---|---|---|
| JP | 2011-081365 A | 4/2011 |
| JP | 2016-118697 A | 6/2016 |

* cited by examiner

*Primary Examiner* — Christopher E Mahoney
(74) *Attorney, Agent, or Firm* — Canon U.S.A., Inc. IP Division

(57) ABSTRACT

A lens apparatus includes an imaging optical system, a storage unit configured to store aperture information about the imaging optical system, and a transmission unit configured to transmit the aperture information to an imaging apparatus, wherein the aperture information is determined based on a shape parameter representing a shape of an aperture which defines an outer edge of a light flux passing through the imaging optical system.

15 Claims, 15 Drawing Sheets

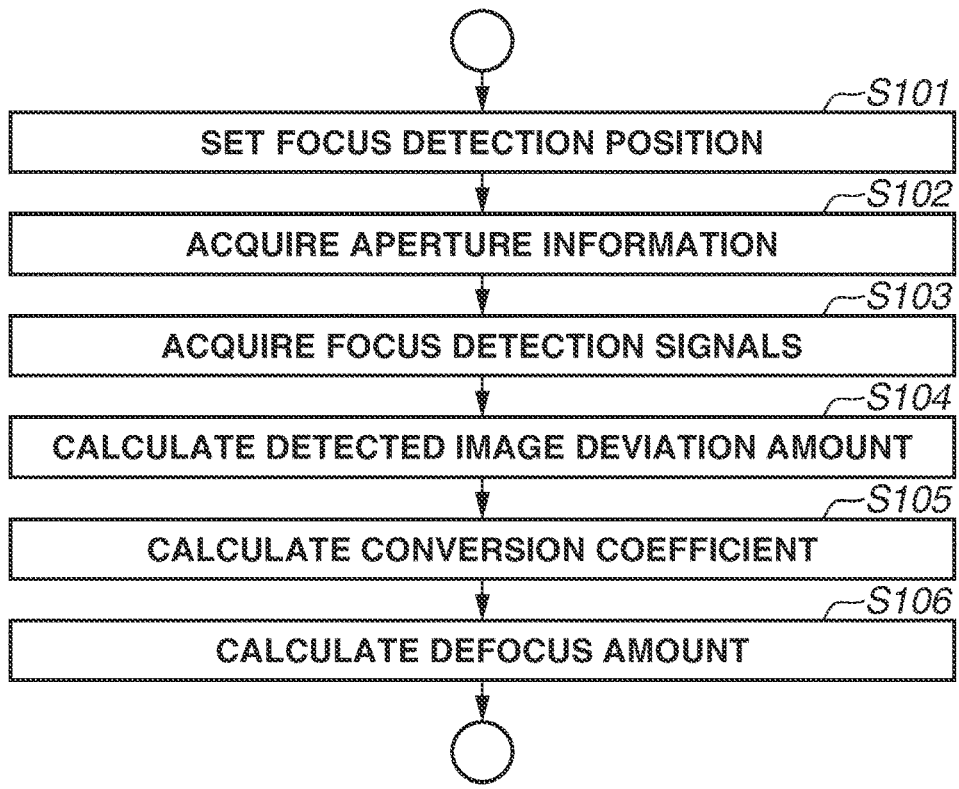
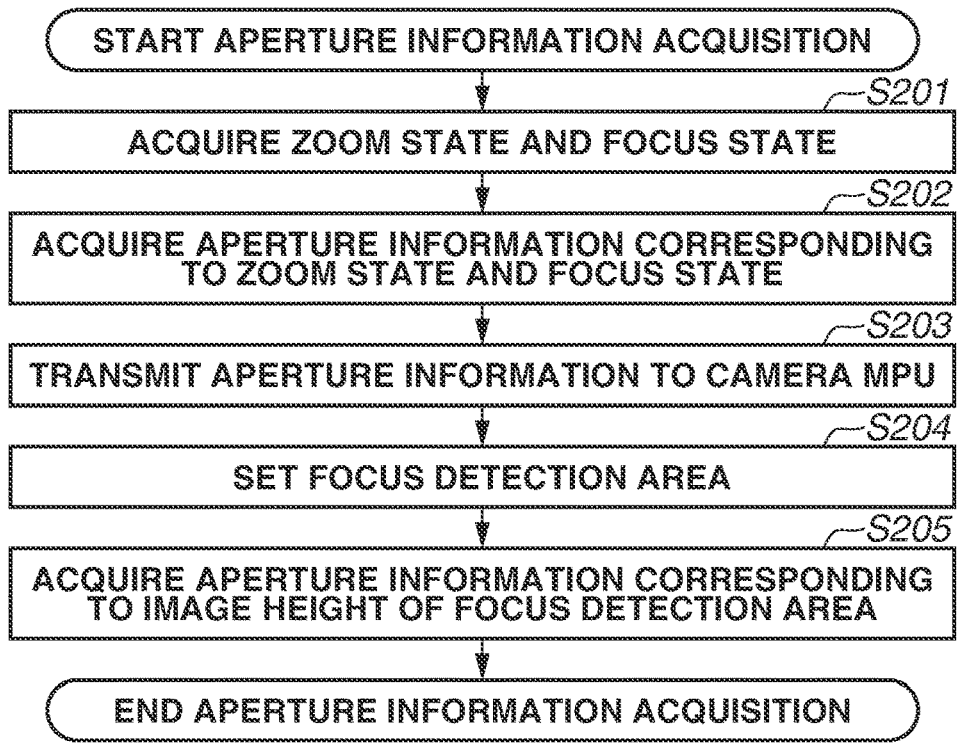

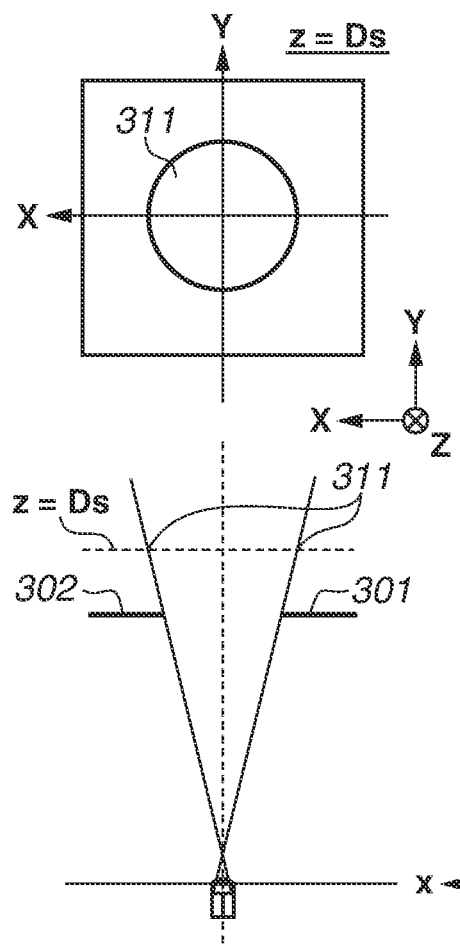
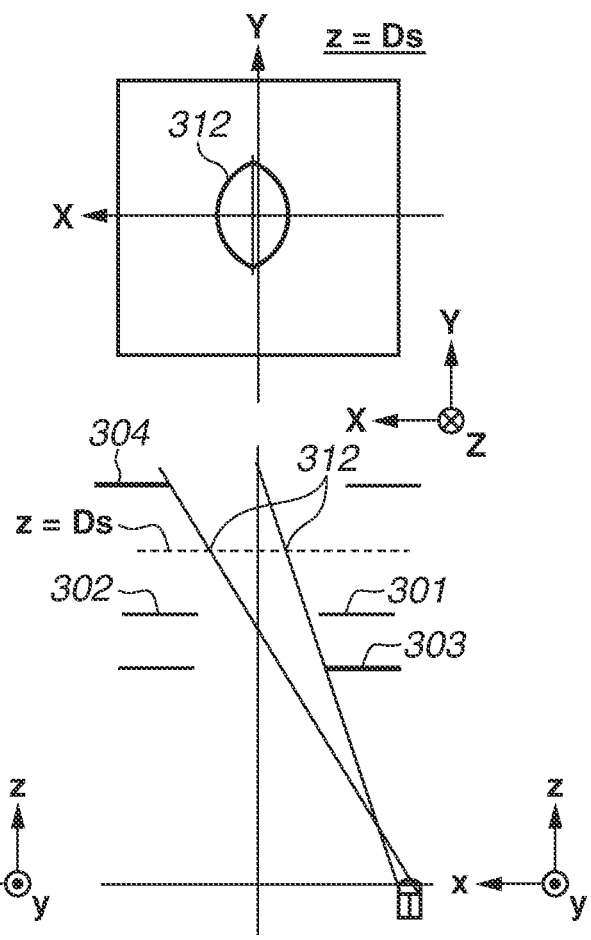

LENS APPARATUS AND CALCULATION METHOD

BACKGROUND

Field of the Disclosure

Aspects of the present disclosure generally relate to a lens apparatus and a calculation method.

Description of the Related Art

There has been proposed an imaging apparatus which performs focus detection with use of transmitted light passing through a partial area of the exit pupil in an imaging optical system.

Japanese Patent Application Laid-Open No. 2011-081365 discusses an imaging apparatus which acquires distances to the respective apertures of an optical system and calculates a center-of-mass distance between the centers of mass of the areas in which the distance measurement pupils of an image sensor and the exit pupil of an interchangeable lens overlap each other. Then, the imaging apparatus converts an image deviation amount into a defocus amount based on the calculated center-of-mass distance.

Moreover, Japanese Patent Application Laid-Open No. 2016-118697 discusses an imaging apparatus which includes a lens in which the range of angles of incidence of imaging light fluxes is stored and a body in which light-receiving sensitivities of the respective focus detection pixels are stored and which controls focus adjustment based on such stored values.

SUMMARY

According to an aspect of the present disclosure, a lens apparatus includes an imaging optical system, a storage unit configured to store aperture information about the imaging optical system, and a transmission unit configured to transmit the aperture information to an imaging apparatus, wherein the aperture information is determined based on a shape parameter representing a shape of an aperture which defines an outer edge of a light flux passing through the imaging optical system.

Further features of the present disclosure will become apparent from the following description of exemplary embodiments with reference to the attached drawings.

BRIEF DESCRIPTION OF THE DRAWINGS

FIGS. 3A and 3B are flowcharts for focus detection and for aperture information acquisition in a first exemplary embodiment.

FIGS. 4A and 4B are schematic explanatory diagrams of aperture information in each exemplary embodiment.

DESCRIPTION OF THE EMBODIMENTS

Various exemplary embodiments, features, and aspects of the disclosure will be described in detail below with reference to the drawings.

<Configuration of Imaging Apparatus>

Figure 1:
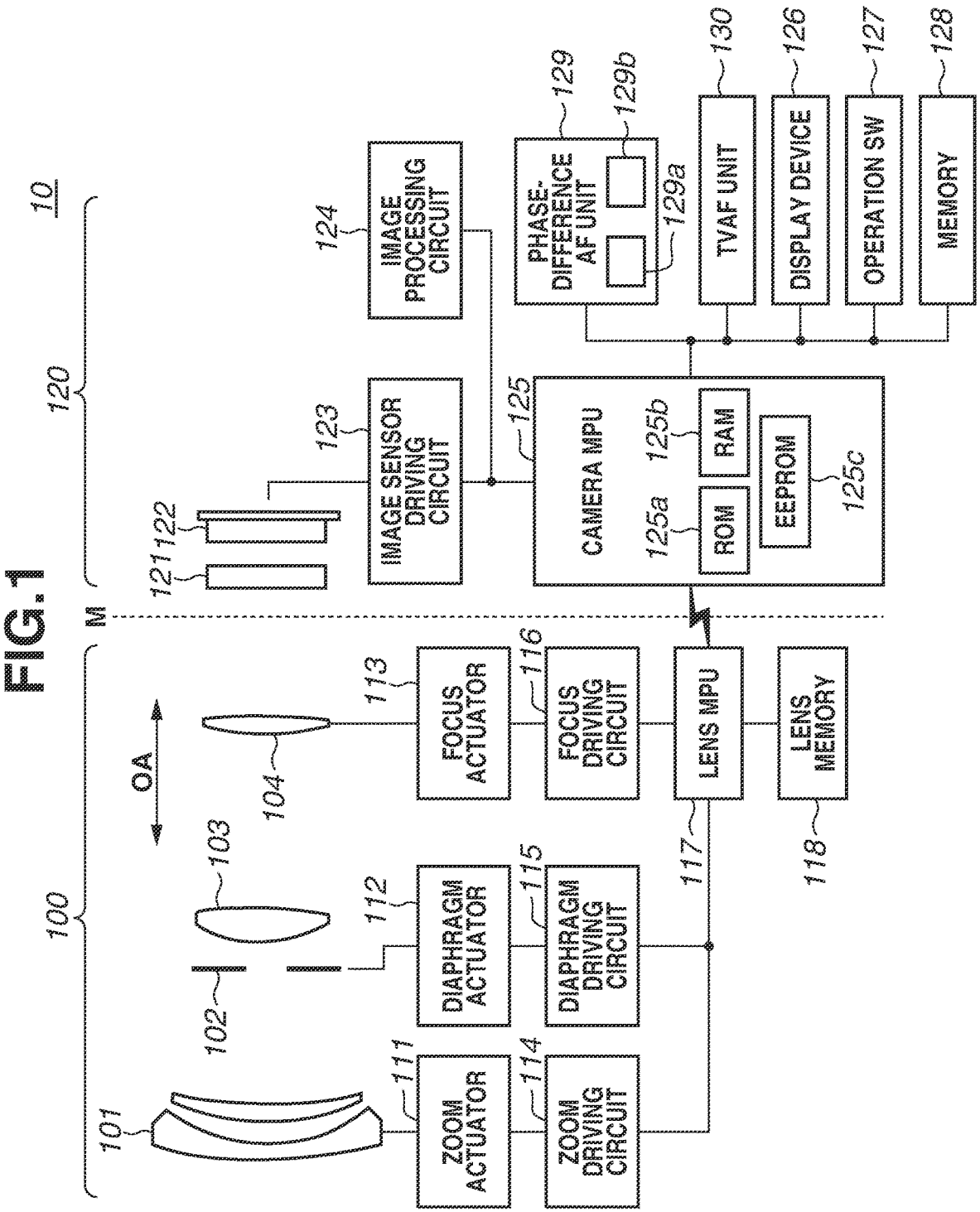
FIG. 1 is a block diagram of an imaging apparatus in each exemplary embodiment.

First, a configuration of an imaging apparatus in a first exemplary embodiment of the present disclosure is described with reference to FIG. 1. FIG. 1 is a block diagram of an imaging apparatus 10 which is a camera system including a lens unit 100 and a camera body 120. The lens unit 100 is detachably attached to the camera body 120 via a mount M, which is indicated by a dotted line in FIG. 1. Although not illustrated in FIG. 1 for description, the mount M has a bayonet mechanism to couple the lens unit 100 and the camera body 120 with each other. Then, the lens unit 100 is electrically connected to the camera body 120 via a plurality of connection terminals for power supply and communication provided at the mount M.

However, the first exemplary embodiment is not limited to this, but can also be applied to an imaging apparatus in which a lens unit and a camera body are integrally configured and an interchange of lenses is not allowed. Moreover, the first exemplary embodiment is not limited to a digital camera, but can also be applied to other types of imaging apparatuses, such as a video camera and a camera-equipped mobile phone.

The lens unit 100 includes a first lens group 101, a diaphragm 102, a second lens group 103, and a focus lens group (hereinafter sometimes referred to as a "focus lens") 104, which together serve as an imaging optical system, and a drive and control system. The lens unit 100 can be configured to have the function of reducing image shake by driving, for example, the second lens group 103 within a plane perpendicular to an optical axis OA.

The first lens group 101 is located at the forefront of the lens unit 100 and is held in such a way as to be able to move forward and backward along the optical axis direction OA. The diaphragm 102 is configured to adjust the amount of light for image capturing with the aperture diameter thereof adjusted and also serves as a shutter for adjusting an exposure time at the time of still image capturing. The diaphragm 102 and the second lens group 103 are able to integrally move along the optical axis direction OA and are configured to implement a zoom function in conjunction with a forward and backward operation of the first lens group 101. The focus lens 104 is able to move along the optical axis direction OA, so that a subject distance (in-focus distance) for which the lens unit 100 becomes in focus varies according to the position of the focus lens 104. Controlling the position of the focus lens 104 in the optical axis direction OA enables performing focus adjustment (hereinafter sometimes referred to as "focus control") for adjusting the in-focus distance of the lens unit 100.

The drive and control system of the lens unit 100 includes a zoom actuator 111, a diaphragm actuator 112, a focus actuator 113, a zoom driving circuit 114, a diaphragm driving circuit 115, a focus driving circuit 116, a lens micro processing unit (MPU) 117, and a lens memory 118. The zoom driving circuit 114 drives the first lens group 101 and the second lens group 103 along the optical axis direction OA with use of the zoom actuator 111, to control the angle of view of the optical system of the lens unit 100, thus performing a zoom operation. Moreover, the zoom driving circuit 114 has a function serving as a position detection unit which detects the current positions of the first lens group 101 and the second lens group 103 (a zoom state ZS) with use of the zoom actuator 111. The diaphragm driving circuit 115 drives the diaphragm 102 with use of the diaphragm actuator 112, thus controlling the aperture diameter of the diaphragm 102 and an opening and closing operation thereof. The focus driving circuit 116 drives the focus lens 104 along the optical axis direction OA with use of the focus actuator 113, to control the in-focus distance of the optical system of the lens unit 100, thus performing focus control. Moreover, the focus driving circuit 116 has a function serving as a position detection unit which detects the current position of the focus lens 104 (a focus state FS) with use of the focus actuator 113.

The lens MPU 117 performs all of the computation and control operations for the lens unit 100, thus controlling the zoom driving circuit 114, the diaphragm driving circuit 115, and the focus driving circuit 116. The lens MPU 117, which includes a processor such as a central processing unit (CPU), comprehensively controls, for example, the zoom driving circuit 114, the diaphragm driving circuit 115, and the focus driving circuit 116 according to parameters stored in the lens memory 118 or a request received from the camera MPU 125. Moreover, the lens MPU 117 is connected to the camera MPU 125 via the mount M, thus communicating commands or data. For example, the lens MPU 117 detects the position of the focus lens 104, and communicates, for example, lens position information in response to a request received from the camera MPU 125. Such lens position information includes information about, for example, the position of the focus lens 104 in the optical axis direction OA, the position of the exit pupil in the optical axis direction OA and the diameter thereof obtained without the optical system being moved, and the position of the lens frame, which limits a light flux passing through the exit pupil, in the optical axis direction OA and the diameter thereof. Moreover, the lens MPU 117 receives a command, which includes a request issued from the camera MPU 125, at predetermined timing. The lens MPU 117 analyzes the contents of the received command and thus performs control operations for the respective constituents of the lens unit 100.

The lens memory 118 stores optical information including, for example, aperture information required for automatic focus adjustment (hereinafter sometimes referred to as "AF control"). The lens MPU 117 transmits the optical information to the camera MPU 125 at predetermined timing or in response to a request received from the camera MPU 125. Moreover, the lens MPU 117 executes programs stored in, for example, a built-in non-volatile memory or the lens memory 118, thus performing calculation of various parameters and performing control of an operation of the lens unit 100. Moreover, such calculation and control can be performed by the camera MPU 125 or a part or all of the processing operations thereof can be performed in a sharing manner.

The lens unit 100 includes a plurality of lens members arranged to fix the respective constituent elements to a tubular main body (hereinafter sometimes referred to as a "lens barrel"). The lens members include not only a lens member which is fixed to the lens barrel itself for reduction of, for example, flare but also a lens member which moves in association with control of each constituent element. For example, a lens member (frame) arranged to fix the focus lens 104 moves in conjunction with the movement of the focus lens 104 along the optical axis direction OA.

The camera body 120 includes an optical low-pass filter 121, an image sensor 122, and a drive and control system. The optical low-pass filter 121 and the image sensor 122 function as an imaging unit which photoelectrically converts a subject image equivalent to an optical image formed through the lens unit 100 to output image data. In the first exemplary embodiment, the image unit outputs as image data, a captured image signal and a focus detection signal.

The optical low-pass filter 121 is an optical member which reduces false color or moire of a captured image. The image sensor 122 is composed of a complementary metal-oxide semiconductor (CMOS) image sensor and its peripheral circuit, and includes m pixels in the horizontal direction by n pixels in the vertical direction (m and n being integers of 2 or more). The image sensor 122 in the first exemplary embodiment has a pupil-dividing function and thus includes pupil-dividing pixels which are able to be used to perform, for example, phase-difference detection-type focus detection (hereinafter sometimes referred to as "phase-difference AF") using image data that is based on pixel signals output from the respective pixels.

The drive and control system of the camera body 120 includes an image sensor driving circuit 123, an image processing circuit 124, a camera MPU 125, a display device 126, an operation switch group (SW) 127, a memory 128, a phase-difference AF unit 129, and a contrast AF TVAF unit 130. In the first exemplary embodiment, the phase-difference AF unit 129 is equivalent to an imaging plane phase-difference focus detection unit, and the TVAF unit 130 is equivalent to a TVAF focus detection unit.

The image sensor driving circuit 123 not only controls an operation of the image sensor 122 but also performs analog-to-digital (A/D) conversion and various correction processing operations on pixel signals output from the image sensor 122 and outputs the processed pixel signals to the camera MPU 125. The image processing circuit 124 performs commonly used image processing such as gamma conversion, white balance adjustment processing, color interpolation processing, and compression coding processing, on image data that is based on pixel signals output from the image sensor 122. Moreover, the image processing circuit 124 generates signals for phase-difference AF.

The camera MPU 125, which includes a processor such as a CPU, performs computations for controlling the respective constituent elements included in the camera body 120. Thus, the camera MPU 125 performs computations for controlling the image sensor driving circuit 123, the image processing circuit 124, the display device 126, the operation switch group 127, the memory 128, the phase-difference AF unit 129, and the TVAF unit 130. The camera MPU 125, which is connected to the lens MPU 117 via signal lines of the mount M, communicates commands and data with the lens MPU 117. The camera MPU 125 issues, to the lens MPU 117, a request for acquisition of the lens position and a request for lens driving at a predetermined drive amount, and also issues, to the lens MPU 117, a request for acquisition of optical information specific for the lens unit 100.

The camera MPU 125 has, incorporated therein, a read-only memory (ROM) 125a, which stores programs used to control operations of the camera body 120, a random access memory (RAM) 125b, which stores variables, and an electrically erasable programmable read-only memory (EE-PROM) 125c, which stores various parameters. Moreover, the camera MPU 125 performs focus detection processing based on a program stored in the ROM 125a. In the focus detection processing, known correlation arithmetic processing is performed with use of a pair of image signals obtained by photoelectrically converting optical images formed by light fluxes passing through respective different pupil regions (pupil-dividing regions) of the imaging optical system.

The display device 126, which is composed of, for example, a liquid crystal display (LCD) or a viewfinder, displays, for example, information about image capturing modes of the imaging apparatus 10, a preview image obtained before image capturing and a confirmatory image obtained after image capturing, and an in-focus state display image for focus detection. The operation switch group 127 includes, for example, a power switch, a release (image capturing trigger) switch, a zoom operation switch, and an image capturing mode selection switch. The memory 128 (a recording unit), which is a removable flash memory, records an image obtained by image capturing therein. Furthermore, the display device 126 can be provided with, for example, a touch panel and thus can be used as the operation switch group 127.

The phase-difference AF unit 129 performs focus detection processing using the phase-difference detection method based on image signals of image data for focus detection which is obtained from the image sensor 122 and the image processing circuit 124. More specifically, the image processing circuit 124 generates, as a focus detection signal, a pair of pieces of image data formed by light fluxes passing through a pair of pupil regions of the imaging optical system, and the phase-difference AF unit 129 performs focus detection based on a deviation amount of the pair of pieces of image data. In this way, the phase-difference AF unit 129 in the first exemplary embodiment, which does not use a dedicated AF sensor, performs phase-difference AF that is based on outputs of the image sensor 122. In the first exemplary embodiment, the phase-difference AF unit 129 includes an acquisition unit 129a and a calculation unit 129b. Operations of the acquisition unit 129a and the calculation unit 129b are described below. Furthermore, at least a part of constituent elements of the phase-difference AF unit 129 (a part of the acquisition unit 129a or the calculation unit 129b) can be provided in a different functional block, such as the camera MPU 125.

The TVAF unit 130 performs focus detection processing using the contrast detection method based on a TVAF evaluation value (contrast information about image data) generated by the image processing circuit 124. In the focus detection processing using the contrast detection method, a focus lens position at which the evaluation value (focus evaluation value) becomes peak as a result of movement of the focus lens group 104 is detected as an in-focus position. Moreover, a contrast value detected by the TVAF unit 130 can be used for calculations to be performed by the phase-difference AF unit 129. For example, the contrast value is able to be used to determine, for example, the reliability of a computation result.

In this way, the imaging apparatus 10 in the first exemplary embodiment is able to perform both imaging plane phase-difference AF and TVAF in combination, and thus can selectively use these or can use these in combination with each other. The phase-difference AF unit 129 and the TVAF unit 130 function as a focus control unit which controls the position of the focus lens 104 with use of the respective focus detection results.

<Image Sensor>

Figure 2:
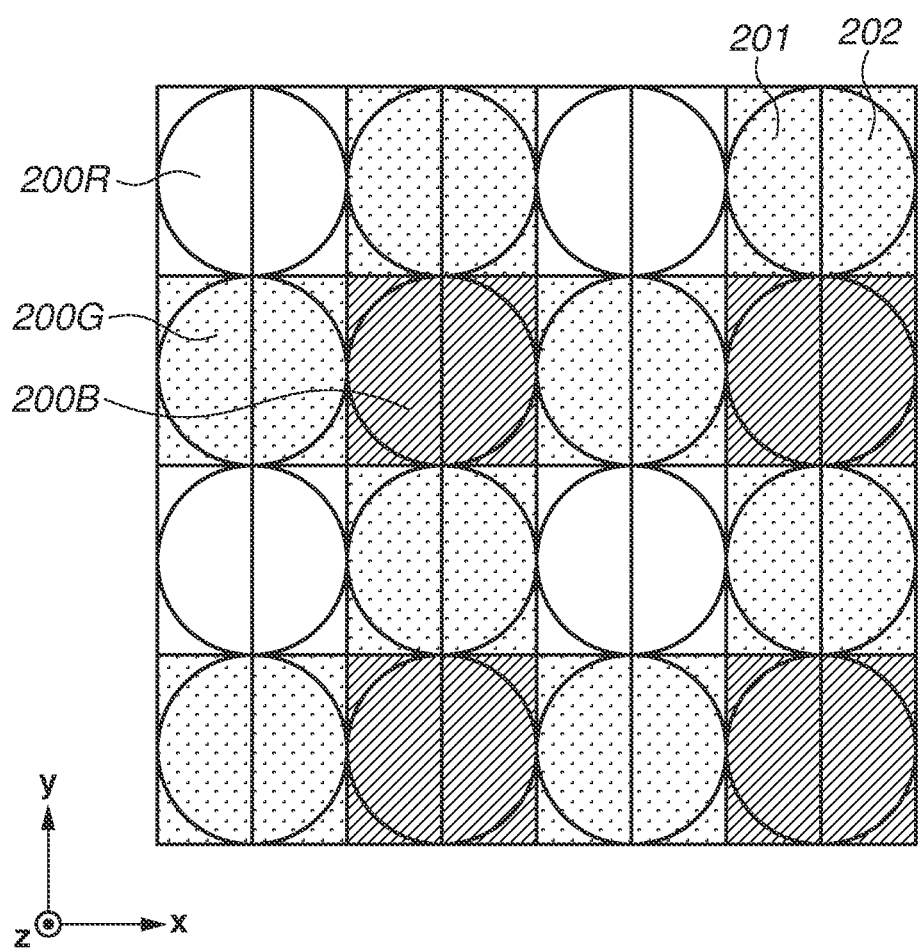
FIG. 2 is a schematic view of an image sensor in each exemplary embodiment.

First, the pixel array and pixel structure of the image sensor (CMOS image sensor) 122 in the first exemplary embodiment are described with reference to FIG. 2. FIG. 2 is a diagram illustrating the pixel (imaging pixel) array of the image sensor 122. Here, the pixel array of the image sensor 122 is illustrated with a range of four columns by four rows. In the first exemplary embodiment, a pixel group 200 composed of two columns by two rows includes pixels 200R, 200G, and 200B arranged in Bayer array. More specifically, in the pixel group 200, a pixel 200R, which has a spectral sensitivity of red (R), is arranged at the upper left, pixels 200G, each of which has a spectral sensitivity of green (G), are arranged at the upper right and the lower left, and a pixel 200B, which has a spectral sensitivity of blue (B), is arranged at the lower right. Each of the pixels 200R, 200G, and 200B is composed of a focus detection pixel (first focus detection pixel) 201 and a focus detection pixel (second focus detection pixel) 202, which are arranged in two columns by one row. Therefore, in FIG. 2, the array of focus detection pixels is illustrated with a range of eight columns by four rows. Furthermore, each pixel in the first exemplary embodiment is composed of two focus detection pixels arranged in the x direction, but is not limited to this, and can be composed of two focus detection pixels arranged in the y direction. Moreover, each pixel can be composed of two or more focus detection pixels, or can be a configuration obtained by combining some combinations.

As illustrated in FIG. 2, the image sensor 122 is configured by arranging a large number of pixel sets each composed of pixels in four columns by four rows (focus detection pixels in eight columns by four rows), and outputs a captured image signal (focus detection signal). With regard to the image sensor 122 in the first exemplary embodiment, the period P of pixels is 6 µm, and the number N of pixels is 24,000,000, in which pixels in 6,000 columns in the horizontal direction by 4,000 rows in the vertical direction are arranged. Moreover, with regard to the image sensor 122, the period PSUB of focus detection pixels in the column direction is 3 µm, and the number NSUB of focus detection pixels is 48,000,000, in which focus detection pixels in 12,000 columns in the horizontal direction by 4,000 rows in the vertical direction are arranged. Furthermore, in the case of acquiring, for example, a moving image of the 4K resolution format with use of the image sensor 122, it is desirable that the image sensor 122 have pixels in 4,000 or more columns in the horizontal directions. Moreover, in the case of acquiring an image of the format having a size larger than that, it is desirable that the image sensor 122 have the number of pixels corresponding to such a format. Moreover, while the period P of pixels is determined by, for example, the image circle and resolution of an imaging optical system for use, the image sensor 122 is able to be applied to a period P of up to about 1 μm, which is equivalent to the diffraction limit of a lens.

In each pixel in the first exemplary embodiment, a microlens used to condense incident light is provided at the side of a light receiving surface, which is the interface of a semiconductor made from, for example, silicon with a photodiode formed thereon. A plurality of such microlenses is arranged in a two-dimensional manner, and each microlens is located a predetermined distance away from the light receiving surface in the z-axis direction (the direction of the optical axis OA), which is perpendicular to the light receiving surface. Moreover, in each pixel, photoelectric conversion portions are formed which are obtained by dividing a pixel into Nx divisions (into halves) in the x direction and into Ny divisions (into one) in the y direction, i.e., into the number of divisions NLF=Nx×Ny (the number of divisions being 2). The respective photoelectric conversion portions correspond to the focus detection pixel 201 and the focus detection pixel 202.

Each photoelectric conversion portion is formed on a semiconductor substrate made from, for example, silicon and is configured as a photodiode of the p-n junction type composed of a p-type layer and an n-type layer. If needed, each photoelectric conversion portion can be configured as a photodiode of the PIN structure, in which an intrinsic layer is sandwiched between a p-type layer and an n-type layer. A corresponding color filter is provided between the microlens and the photoelectric conversion portion. If needed, the spectral transmittance of a color filter can be varied for every pixel or for every photoelectric conversion portion, or color filters can be omitted.

Light which is made incident on the pixel group 200 is condensed by the microlenses and dispersed by the color filters, and is then received by the respective photoelectric conversion portions. In each photoelectric conversion portion, a pair of an electron and a hole is generated according to the amount of received light, and, after the electron and the hole are separated from each other by a depletion layer, an electron of negative charge is accumulated in the n-type layer. On the other hand, the hole is discharged to the outside of the image sensor 122 through the p-type layer connected to a constant voltage source (not illustrated). The electron accumulated in the n-type layer of the photoelectric conversion portion is transferred to an electrostatic capacitance portion (floating diffusion (FD)) via a transfer gate and is thus converted into a voltage signal.

Furthermore, in the first exemplary embodiment, the microlens is equivalent to an optical system in the image sensor 122. Such an optical system can be configured to include a plurality of microlenses, or can be configured to be made from a material different in refractive index from, for example, a waveguide. Moreover, the image sensor 122 can be a backside irradiation-type image sensor, in which, for example, a circuit is provided on a surface opposite to the surface on which a microlens is mounted, or can be a stacked-type image sensor in which some of, for example, the image sensor driving circuit 123 and the image processing circuit 124 are further provided on that surface. Moreover, the semiconductor substrate can be made from a material other than silicon, so that, for example, an organic material can be used as a photoelectric conversion material.

<Aperture Information Acquisition Flow>

In the following, the flows of focus detection and aperture information acquisition in the first exemplary embodiment are described with reference to FIGS. 3A and 3B. Aperture information in the first exemplary embodiment is stored in the lens memory 118, and, in response to a request from the camera MPU 125, the lens MPU 117 transmits the aperture information to the camera MPU 125. While, in the present exemplary embodiment, an example in which the aperture information is stored in the lens memory 118 is described, the aperture information can be stored in and acquired from the memory 128. Moreover, the aperture information can be acquired from an external apparatus by a predetermined communication unit included in the camera MPU 125.

A focus detection method in the first exemplary embodiment which is performed by the camera MPU 125 is described with reference to FIG. 3A. FIG. 3A is a flowchart illustrating the focus detection method in the first exemplary embodiment. The focus detection method in the first exemplary embodiment is performed according to a focus detection program which runs on software or hardware as a computer program. The focus detection program can be previously recorded in the memory 128 included in the camera body 120, or can be previously recorded on a computer-readable recording medium. Moreover, while, in the first exemplary embodiment, the camera MPU 125 performs the focus detection method, a personal computer (PC) or a dedicated apparatus can operate as a focus detection apparatus to perform the focus detection method described in the first exemplary embodiment. Moreover, a circuit which corresponds to the focus detection program in the first exemplary embodiment can be provided, so that the focus detection method in the first exemplary embodiment can be performed by causing the circuit to operate.

In step S101 illustrated in FIG. 3A, the camera MPU 125, which operates as a focus detection position setting unit, sets image height coordinates $(x_{AF}, y_{AF})$ of a focus detection position on the image sensor 122 with respect to which to perform focus detection. Next, the camera MPU 125 calculates an image height $r_{AF}$ of the focus detection position from the image height coordinates $(x_{AF}, y_{AF})$ according to formula (1). Then, the processing proceeds to step S102. Furthermore, in the first exemplary embodiment, although not described in detail, the camera MPU 125 can be configured to set image height coordinates in consideration of the amount of shift of the optical axis position caused by, for example, camera shake correction.

$$r_{AF} = \sqrt{x_{AF}^2 + y_{AF}^2} \tag{1}$$

In step S102 illustrated in FIG. 3A, the camera MPU 125 acquires aperture information corresponding to the optical condition of the imaging optical system. Specifically, the camera MPU 125 acquires aperture information corresponding to the optical condition including, for example, the image height coordinates $(x_{AF}, y_{AF})$ of the focus detection position and the focus state FS and zoom state ZS of the imaging optical system (interchangeable lens). Then, the processing proceeds to step S103.

In step S103 illustrated in FIG. 3A, the camera MPU 125 controls the image sensor driving circuit 123 to acquire pixel signals obtained by the focus detection pixel 201 and the focus detection pixel 202 of each pixel of the image sensor 122 receiving light. Alternatively, the camera MPU 125 can use pixel signals which were previously acquired by the image sensor 122 in the first exemplary embodiment and stored in, for example, a recording medium. Next, the camera MPU 125 generates a first focus detection signal and a second focus detection signal corresponding to the respective different pupil portion regions of the imaging optical system based on the pixel signals. Thus, the camera MPU 125 generates each focus detection signal based on signals from pixels corresponding to the same pupil portion region.

More specifically, pixel signals obtained by the image sensor 122 performing image capturing are assumed to be denoted by LF. Moreover, in the pixel signals LF, a focus detection pixel signal which is the $i_s$-th($1 \leq i_s \leq N_X$) in the column direction and the $j_s$-th($1 \leq j_s \leq N_y$) in the row direction is assumed to be the k-th focus detection pixel signal while setting $k=N_x(j_s-1)+i_s$ ($1 \leq k \leq N_{LF}$). The camera MPU 125 generates the k-th focus detection signal $I_k(j, i)$ which is the i-th in the column direction and the j-th in the row direction, which corresponds to the k-th pupil region of the imaging optical system, according to the following formula (2).

$$I_k(j,i) = I_{N_x(j_S-1)+i_S}(j,i) = LF(N_y(j-1)+j_S, N_x(i-1)+i_S). \quad (2)$$

In the first exemplary embodiment, an example in which division into halves in the x direction is employed with $N_X=2$, $N_y=1$, $N_{LF}=2$, with k=1 and k=2 is described. The camera MPU 125 selects a signal of the first focus detection pixel 201 obtained by division into halves in the x direction for each pixel from among pixel signals corresponding to the pixel array illustrated in FIG. 2 as an example. Accordingly, the camera MPU 125 generates a first focus detection signal and a second focus detection signal $I_2(j, i)$ which are RGB signals of the Bayer array having a resolution of the number of pixels N(=horizontal number of pixels $N_H$ × vertical number of pixels $N_v$), which correspond to the pupil portion regions of the imaging optical system.

Next, the camera MPU 125 generates the k-th focus detection luminance signals $Y_k$ (k=1, 2) with the respective centers of mass of RGB colors coinciding with each other, for every position (j, i) from the k-th focus detection signals $I_k$(k=1, 2), which are RGB signals of the Bayer array. If needed, to improve the focus detection accuracy, the camera MPU 125 can perform, for example, shading (light amount) correction processing on the k-th focus detection luminance signals $Y_k$.

$$Y_k(j, i) = \begin{pmatrix} I_k(j-1, i-1) & I_k(j-1, i) & I_k(j-1, i+1) \\ I_k(j, i-1) & I_k(j, i) & I_k(j, i+1) \\ I_k(j+1, i-1) & I_k(j+1, i) & I_k(j+1, i+1) \end{pmatrix} \begin{pmatrix} \frac{1}{16} & \frac{2}{16} & \frac{1}{16} \\ \frac{2}{16} & \frac{4}{16} & \frac{2}{16} \\ \frac{1}{16} & \frac{2}{16} & \frac{1}{16} \end{pmatrix}. \quad (3)$$

Next, the camera MPU 125 performs one-dimensional bandpass filter processing on the k-th focus detection luminance signals $Y_k$(k=1, 2) in the pupil division direction (column direction), thus generating a first focus detection signal dYA limited to an approximate wavenumber $k_{AF}$ component. Moreover, the camera MPU 125 performs one-dimensional bandpass filter processing on the second focus detection luminance signals $Y_2$ in the pupil division direction (column direction), thus generating a second focus detection signal dYB limited to an approximate wavenumber $k_{AF}$ component. The one-dimensional bandpass filter to be used includes, for example, a first derivation type filter [1, 5, 8, 8, 8, 5, 1, −1, −5, −8, −8, −8, −5, −1]. If needed, it is favorable to adjust the pass band of the one-dimensional bandpass filter. For example, the camera MPU 125 can perform processing for simple addition so as to reduce high-frequency noise components. Then, the processing proceeds to step S104.

In step S104 illustrated in FIG. 3A, the camera MPU 125, which serves as an image deviation amount detection unit, calculates a detected image deviation amount based on the focus detection signals. The first focus detection signal which is the $j_2$-th($-n_2 \leq j_2 \leq n_2$) in the row direction and the $i_2$-th($-m_2 \leq i_2 \leq m_2$) in the column direction, which corresponds to the pupil division direction, as viewed from the focus detection position ($j_{AF}$, $i_{AF}$) and which is limited to an approximate wavenumber $k_{AF}$ component is assumed to be denoted by dYA($j_{AF}+j_2$, $i_{AF}+i_2$) Additionally, the second focus detection signal is assumed to be denoted by dYB ($j_{AF}+j_2$, $i_{AF}+i_2$). When the shift amount is denoted by s($-n_5 \leq s \leq n_s$), the camera MPU 125 calculates the correlation amount $COR_{EVEN}(j_{AF}, s)$ at each position ($j_{AF}$, $i_{AF}$) according to formula (4A) and calculates the correlation amount $COR_{ODD}(j_{AF}, j_{AF}, s)$ at each position ($j_{AF}$, $i_{AF}$) according to formula (4B).

$$COR_{even}(j_{AF}, i_{AF}, s) = \sum_{j_2=-n_2}^{n_2} \sum_{i_2=-m_2}^{m_2} |dYA(j_{AF}+j_2, i_{AF}+i_2+s) - dYB(j_{AF}+j_2, i_{AF}+i_2-s)| \quad (4A)$$

$$COR_{odd}(j_{AF}, i_{AF}, s) = \sum_{j_2=-n_2}^{n_2} \sum_{i_2=-m_2}^{m_2} |dYA(j_{AF}+j_2, i_{AF}+i_2+s) - dYB(j_{AF}+j_2, i_{AF}+i_2-1-s)| \quad (4B)$$

The correlation amount $COR_{oDD}(j_{AF}, j_{AF}, s)$ is a correlation amount obtained by shifting the shift amounts of the first focus detection signal dYA limited to an approximate wavenumber $k_{AF}$ component and the second focus detection signal dYB by a "half-phase−1" shift with respect to the correlation amount $COR_{EVEN}(j_{AF}, i_{AF}, s)$.

Next, the camera MPU 125 performs sub-pixel computation on the correlation amount $COR_{EvEN}(j_{AF}, i_{AF}, s)$ and the correlation amount $COR_{oDD}(j_{AF}, i_{AF}, s)$ to calculate the respective shift amounts as real values according to which the respective correlation values become minimum and then calculate an average value of the shift amounts. Then, the camera MPU 125 calculates a detected image deviation amount $q_{det}$ in the focus detection position ($j_{AF}$, $i_{AF}$). Then, the processing proceeds to step S105.

In step S105 illustrated in FIG. 3A, the camera MPU 125, which serves as a conversion coefficient acquisition unit, calculates a conversion coefficient K for performing conversion into a defocus amount $d_{det}$ from the detected image deviation amount (pet. The camera MPU 125 uses the aperture information acquired in step S102 to calculate the conversion coefficient K in step S105. More specifically, the camera MPU 125 previously stores parameters corresponding to the aperture information in, for example, the memory 128 and calculates the conversion coefficient K with use of the parameters. Moreover, the camera MPU 125 can previously store the conversion coefficient K itself as a table corresponding to the aperture information in the memory 128. Furthermore, while, in the first exemplary embodiment, an example in which processing operations in the respective steps are performed by the camera MPU 125 is described, a configuration in which a part of the process of calculating the conversion coefficient K is performed by, for example, an external PC and a result of the calculation process is then retained in a memory, can be employed. Previously performing a part of the calculation process enables reducing a computation load on the camera MPU 125. Then, the processing proceeds to step S106.

In step S106 illustrated in FIG. 3A, the camera MPU 125 calculates a defocus amount $d_{det}$ by multiplying the detected image deviation amount $q_{det}$ by the conversion coefficient K. Furthermore, while an example in which the calculation of the defocus amount $d_{det}$ is performed on pixel signals output from the image sensor 122 has been described, the present exemplary embodiment is not limited to this, but the calculation of the defocus amount $d_{det}$ can be performed on pixel values stored in, for example, the memory 128 or an external PC.

FIG. 3B is a flowchart for aperture information acquisition in step S102 illustrated in FIG. 3A in the first exemplary embodiment. Furthermore, processing operations illustrated in FIG. 3B are performed by the lens MPU 117, the lens memory 118, and the camera MPU 125. While it is favorable that the acquisition of aperture information is performed at the time of start-up of the camera body 120, the acquisition of aperture information can be periodically performed with a predetermined period or can be performed, for example, in a case where the focus state FS or the zoom state ZS has been changed, in a case where a focus detection area has been set, or when an image capturing operation is performed.

First, in step S201 illustrated in FIG. 3B, the lens MPU 117 acquires the current zoom state ZS from the zoom driving circuit 114 and acquires the current focus state FS from the focus driving circuit 116. Furthermore, in this operation, the lens MPU 117 can previously store the zoom state ZS and the focus state FS periodically in, for example, the lens memory 118 and can acquire such stored information.

Next, in step S202 illustrated in FIG. 3B, the lens MPU 117 acquires, from the lens memory 118, aperture information corresponding to the zoon state ZS and the focus state FS acquired in step S201. The lens memory 118 stores aperture information as a table for every zoom state ZS, which is obtained by dividing a zoom range into a plurality of zoom states, for every focus state FS, which is obtained by dividing a focus range into a plurality of focus states, and for every image height, which is obtained by dividing an image height range into a plurality of image heights. Then, the lens MPU 117 calculates and determines aperture information corresponding to the acquired current zoom state ZS and focus state FS by performing linear interpolation based on aperture information corresponding to nearby states. Furthermore, the image height is calculated and acquired by the camera MPU 125 as described below, but can be set as a coordinate position on the imaging plane. Moreover, while, in the first exemplary embodiment, aperture information corresponding to the current states is calculated and acquired by performing linear interpolation, aperture information corresponding to the nearest states can be acquired as aperture information corresponding to the current states, or aperture information corresponding to the current states can be acquired by using a calculation method other than linear interpolation.

Next, in step S203 illustrated in FIG. 3B, the lens MPU 117 transmits the aperture information acquired in step S202 to the camera MPU 125. The aperture information to be transmitted in step S203 is aperture information corresponding to a plurality of image heights. Furthermore, the aperture information to be transmitted can be aperture information only corresponding to an image height designated by the camera MPU 125 or can be aperture information corresponding to all of the image heights. Moreover, the range of aperture information to be transmitted can be configured to be switched as appropriate.

Next, in step S204 illustrated in FIG. 3B, the camera MPU 125 controls the phase-difference AF unit 129 to set a focus detection area, which is a target for focus adjustment, from within the effective pixel region of the image sensor 122. While, here, an example in which the phase-difference AF unit 129 sets the focus detection area has been described, the TVAF unit 130 can be configured to set a focus detection area, which is a target for focus adjustment, from within the effective pixel region of the image sensor 122. Moreover, setting of the focus detection area can be configured to be performed by, for example, the user performing an operation on the operation SW 127 or by, for example, the image processing circuit 124 detecting a subject, such as the face of a specific person, in the effective pixel region.

Next, in step S205 illustrated in FIG. 3B, the camera MPU 125 acquires aperture information about the set image height from the aperture information received in step S203 based on the image height of the focus detection area set in step S204. Since the aperture information acquired in step S203 is aperture information about a plurality of image heights, in step S205, the camera MPU 125 acquires aperture information about the image height of the focus detection area set in step S204 by performing linear interpolation on aperture information about the nearby image heights. While, in the first exemplary embodiment, aperture information about the image height of the set focus detection area is calculated by performing linear interpolation, aperture information about the nearest image height can be acquired as aperture information about the set image height.

In the description of the first exemplary embodiment, it is assumed that aperture information is used for calculation of the defocus amount or for focus detection for the imaging optical system. However, aperture information can be used for, for example, exposure adjustment and various image processing operations, and, in that case, as with the first exemplary embodiment, in step S204, the camera MPU 125 sets aperture information about an image height on which processing is intended to be performed and, then in step S205, acquires aperture information corresponding to the set aperture information.

<Aperture Information>

Next, the aperture information is described with reference to FIGS. 4A and 4B. FIGS. 4A and 4B are explanatory diagrams of the shapes of an aperture which defines an outer edge of a light flux passing through the imaging optical system. Specifically, FIGS. 4A and 4B illustrate the behaviors of light collected from the imaging optical system being received at the light receiving surface of the image sensor 122. Furthermore, it is assumed that the light receiving surface is set as the origin in the z direction, the optical axis OA of the imaging optical system approximately coincides with the z axis, and a direction opposite to the incident direction of light is set as positive. Moreover, the light receiving surface exits within an xy plane perpendicular to the z axis, and the origin thereof approximately coincides with the optical axis OA. FIG. 4A illustrates a relationship between a lens member 301, which defines a light flux on the lower line side at the central image height (near the optical axis OA), a lens member 302, which defines a light flux on the upper line side at the central image height, and an aperture shape 311. FIG. 4B illustrates a relationship between a lens member 303, which defines a light flux on the lower line side at the peripheral image height, a lens member 304, which defines a light flux on the upper line side at the peripheral image height, and an aperture shape 312. Furthermore, the aperture shape is a pupil shape obtained by projecting a result caused by a plurality of members onto the sensor entrance pupil. Furthermore, the aperture shape can be defined not only based on the sensor entrance pupil but also based on the exit pupil of the imaging optical system, or can be defined based on a previously determined position on the z axis.

Here, the sensor entrance pupil of the image sensor 122 is described. In the image sensor 122 in the first exemplary embodiment, microlenses are arranged while continuously shifting toward the center of the image sensor according to the image height coordinates for the respective pixels located at the respective image height coordinates on the two-dimensional plane. In other words, microlenses are arranged in such a way as to be more inclined toward the optical axis OA with respect to the respective photoelectric conversion portions as the image heights thereof become larger. Furthermore, the center of the image sensor 122 and the optical axis OA of the imaging optical system are varied by a mechanism which reduces the influence of blurring caused by, for example, a camera shake by driving the imaging optical system or the image sensor, but approximately coincide with each other. With this, in a pupil plane located in a position away from the image sensor 122 by a distance Ds, first pupil intensity distributions corresponding to light receiving areas of the first focus detection pixels 201 of the respective pixels located at the respective image height coordinates of the image sensor 122 are configured to approximately coincide with each other. Similarly, second intensity distributions corresponding to light receiving areas of the second focus detection pixels 202 are configured to approximately coincide with each other. In other words, in a pupil plane located in a position away from the image sensor 122 by the distance Ds, the first pupil intensity distributions and the second pupil intensity distributions of all of the pixels of the image sensor 122 are configured to approximately coincide with each other. Hereinafter, the first pupil intensity distributions and the second pupil intensity distributions are referred to as a "sensor entrance pupil" of the image sensor 122, and the distance Ds is referred to as an "entrance pupil distance" of the image sensor 122. Furthermore, not all of the pixels need to be configured to have a single entrance pupil distance, but, for example, a configuration in which the entrance pupil distances of pixels corresponding to up to 80% of the maximum image height approximately coincide with each other can be employed or a configuration in which pixels have respective entrance pupil distances which differ for each row or for each detection area can be employed.

FIG. 4A illustrates a state in which the focus detection area, which is set in step S204, has been set to a central image height ((x, y)=(0, 0)). In the case of the central image height illustrated in FIG. 4A, the aperture shape is defined by the lens member 301 and the lens member 302, which are arranged in the same xy plane, and the defined aperture shape becomes circular in the entrance pupil distance Ds.

FIG. 4B illustrates a state in which the focus detection area, which is set in step S204, has been set to a peripheral image height ((x, y)=(−10, 0)). In the case of the peripheral image height illustrated in FIG. 4B, the aperture shape is not defined by the lens member 301 and the lens member 302 but defined by the lens member 303 and the lens member 304, and the defined aperture shape does not become circular in the entrance pupil distance Ds. While, in FIG. 4B, an example in which the aperture is defined by two lens members has been described, the aperture may be defined by three or more lens members and, in that case, the aperture shape becomes a more complicated shape.

Figure 5C:
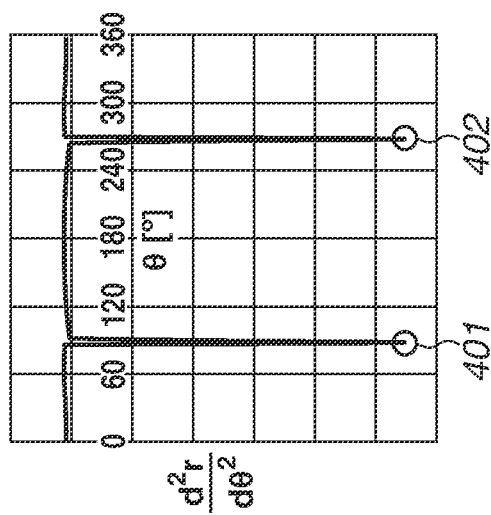
FIGS. 5A, 5B, and 5C are schematic explanatory diagrams of a calculation method for aperture information in each exemplary embodiment.
Figure 5B:
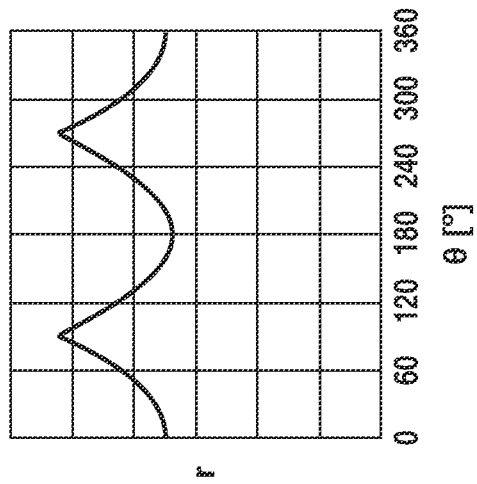
Figure 5A:
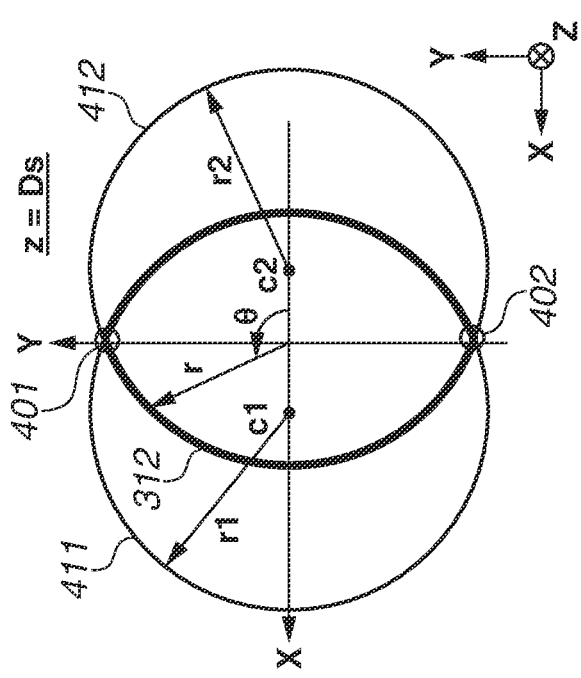

Next, a calculation method for aperture information is described with reference to FIGS. 5A, 5B, and 5C and FIGS. 6A, 6B, and 6C. FIGS. 5A to 5C are schematic explanatory diagrams of the calculation method for aperture information, in which FIG. 5A illustrates the aperture shape 312 illustrated in FIG. 4B as aperture information expressed by a thick line and FIGS. 5B and 5C illustrate evaluation values (shape parameters) for use in aperture information calculation. Furthermore, control for such a calculation can be performed by the camera MPU 125 or the lens MPU 117 within the control flows illustrated in FIGS. 3A and 3B, or only results of calculations performed in advance can be previously stored in, for example, the lens memory 118.

In the first exemplary embodiment, as aperture information which is to be stored in the lens memory 118, the aperture shape is expressed by the positions and sizes of two circles. The position and size of each circle are equivalent to a shape obtained by projecting the shape (radius and position) of each lens member onto the entrance pupil plane of the lens. In FIG. 5A, the aperture shape 312 is expressed by aperture information 411 (position c1 and radius r1) and aperture information 412 (position c2 and radius r2). The aperture information 411 is calculated by performing fitting with use of a region curving clockwise from a point 401 to a point 402 of the aperture shape 312, and the aperture information 412 is calculated by performing fitting with use of a region curving counterclockwise from the point 401 to the point 402 of the aperture shape 312. In other words, the aperture shape 312 is obtained with use of two arcs which differ in center and radius. Furthermore, while, in the first exemplary embodiment, the optical axis OA is used as the center used to define a rotation angle θ in performing fitting, the first exemplary embodiment is not limited to this.

The point 401 and the point 402 are discrete points of secondary differentiation of distances from a predetermined position to the aperture shape 312. In FIG. 5B, the horizontal axis indicates the rotation angle θ illustrated in FIG. 5A, and the vertical axis indicates a distance r from the coordinates (X, Y)=(0, 0) illustrated in FIG. 5A to the aperture shape 312. In FIG. 5C, the horizontal axis indicates the rotation angle θ illustrated in FIG. 5A, and the vertical axis indicates a value obtained by performing second-order differentiation on the distance r with respect to the rotation angle θ. Discrete points 401 and 402 illustrated in FIG. 5C correspond to the point 401 and the point 402 illustrated in FIG. 5A, and these discrete points are used to determine a fitting range for use in aperture information calculation. Since points at which a change in distance from a predetermined position becomes discontinuous appear as discrete points of secondary differentiation of the distance change, these discrete points are able to be used to separate the aperture shape for each area which is expressed as one piece of aperture information. In other words, connecting two arcs based on discrete points of secondary differentiation enables expressing an aperture shape, which is a complicated shape, by parameters of positions and radii with a high degree of accuracy.

Next, the aperture information calculation method in a case where the aperture is defined by a plurality of lens members and the aperture shape thus, becomes a more complicated shape, is described with reference to FIGS. 6A, 6B, and 6C.

Figure 6C:
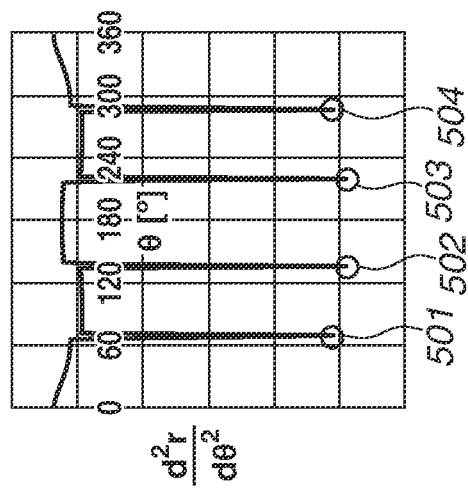
FIGS. 6A, 6B, and 6C are schematic explanatory diagrams of a calculation method for aperture information in each exemplary embodiment.
Figure 6B:
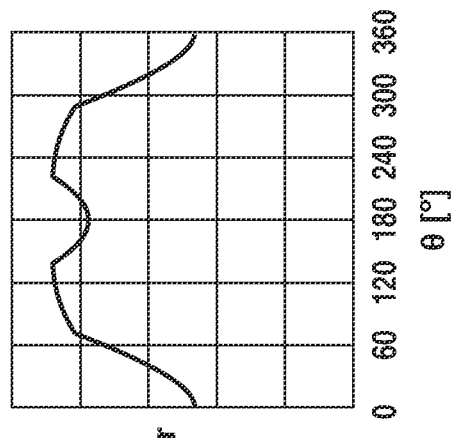
Figure 6A:
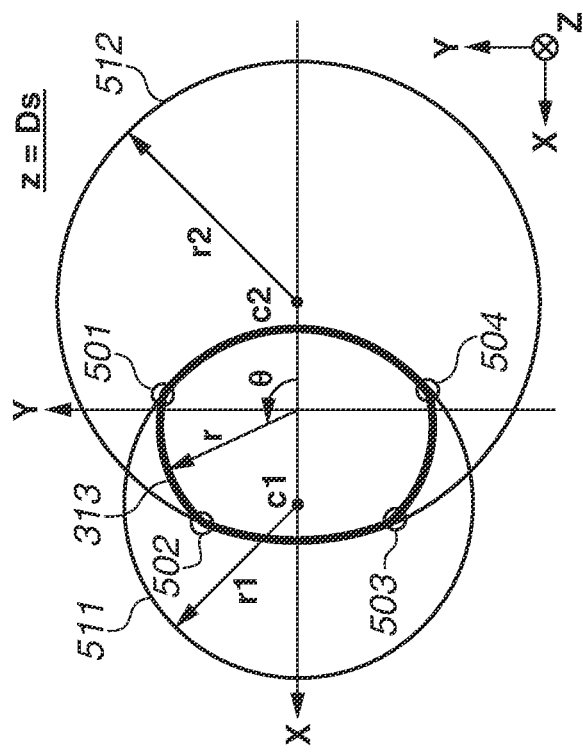

FIG. 6A illustrates the behavior in which the aperture shape 313, in which the aperture is defined by a plurality of lens members illustrated in FIG. 4B, is expressed as aperture information, and FIG. 6B and FIG. 6C illustrate evaluation values (shape parameters) for use in aperture information calculation.

In the first exemplary embodiment, the aperture shape is expressed by the positions and sizes of two circles. FIG. 6A illustrates an example in which the aperture shape 313 is expressed by aperture information 511 (position c1 and radius r1) and aperture information 512 (position c2 and radius r2). The aperture information 511 is calculated by performing fitting with use of a region curving clockwise from a point 501 to a point 504 of the aperture shape 313, and the aperture information 512 is calculated by performing fitting with use of a region curving counterclockwise from a point 502 to a point 503 of the aperture shape 313.

The point 501 to the point 504 are discrete points of secondary differentiation of distances from a predetermined position to the aperture shape 313. In FIG. 6B, the horizontal axis indicates the rotation angle θ illustrated in FIG. 6A, and the vertical axis indicates a distance r from the coordinates (X, Y)=(0, 0) illustrated in FIG. 6A to the aperture shape 313. In FIG. 6C, the horizontal axis indicates the rotation angle θ illustrated in FIG. 6A, and the vertical axis indicates a value obtained by performing second-order differentiation on the distance r with respect to the rotation angle θ. Discrete points 501 to 504 illustrated in FIG. 6C correspond to the point 501 to the point 504 illustrated in FIG. 6A, and these discrete points are used to determine a fitting range for use in aperture information calculation.

In the first exemplary embodiment, the accuracy of the upper line and lower line of the aperture shape is prioritized, and fitting is performed with use of a region curving clockwise from the point 501 to the point 504 of the aperture shape 313 and a region curving counterclockwise from the point 502 to the point 503. Thus, a space between the point 501 and the point 502 and a space between the point 503 and the point 504 are not able to be accurately expressed by the aperture information 511 (position c1 and radius r1) and the aperture information 512 (position c2 and radius r2). However, since each pixel included in the image sensor 122 in the first exemplary embodiment has a plurality of photoelectric conversion portions formed in the x direction, the aperture shape in the x direction becomes an influence on the defocus detection accuracy. Therefore, the aperture shape itself is a complicated shape, but is able to be modeled into a simple shape by using appropriate parameters in a range having an influence on defocus detection.

While, in the first exemplary embodiment, the accuracy of the upper line and lower line is prioritized, a fitting range for a circle can be determined from discrete points having large secondary differential values in which the degree of discontinuity of a change becomes large out of discrete points. Moreover, while, in the first exemplary embodiment, fitting is performed with a region, calculation for fitting can be performed based on several points within a range determined by discrete points. Moreover, while, in the first exemplary embodiment, a fitting range is set based on discrete points of secondary differentiation of distances from a predetermined position, a fitting range can be set based on changing points of the radius of curvature of the aperture shape to calculate aperture information. Moreover, while, in the first exemplary embodiment, fitting is performed based on discrete points of secondary differentiation of distances from a predetermined position, aperture information can be calculated in such a manner that the difference between the aperture shape and the aperture information becomes minimum with respect to a width at each Y coordinate (a difference between X coordinates at the upper line side and the lower line side). Moreover, aperture information can be calculated in such a manner that the difference between the area of the aperture shape and the area of the aperture information (the area of an intersection of the aperture information 511 and the aperture information 512) becomes minimum.

Moreover, while, in the first exemplary embodiment, the aperture shape to be obtained is expressed as a function with two pieces of aperture information used as parameters, the aperture shape can be expressed by three or more pieces of aperture information. In that case, although the required storage capacity of the lens memory 118 increases, the accuracy of expression of the aperture shape using aperture information is able to be improved. Moreover, as aperture information, the positions of the respective points (401, 402 and 501 to 504) and the rotation angle θ can be used as parameters.

Moreover, in the first exemplary embodiment, aperture information is previously stored in the lens memory 118 and is then acquired therefrom, but can be previously stored in the memory 128 and be then acquired therefrom. Moreover, the aperture shape can be previously stored on a network, aperture information can be calculated by the calculation method described in the first exemplary embodiment, and the calculated aperture information can be acquired by performing communication with the lens unit 100 or the camera body 120.

With the above-described configuration, it becomes possible to express the aperture shape with a simple configuration without decreasing the accuracy of aperture information.

Next, a second exemplary embodiment of the present disclosure is described. The second exemplary embodiment differs from the first exemplary embodiment in a method of expressing aperture information. The other configuration and operation in the second exemplary embodiment are similar to those in the first exemplary embodiment, and are, therefore, omitted from description. While, in the first exemplary embodiment, aperture information is expressed by positions (c1 and c2) and sizes (r1 and r2) of circles and is retained, in the second exemplary embodiment, an example in which aperture information is retained as information about distances from the center position of the diaphragm 102 of the imaging optical system is described.

Figure 7:
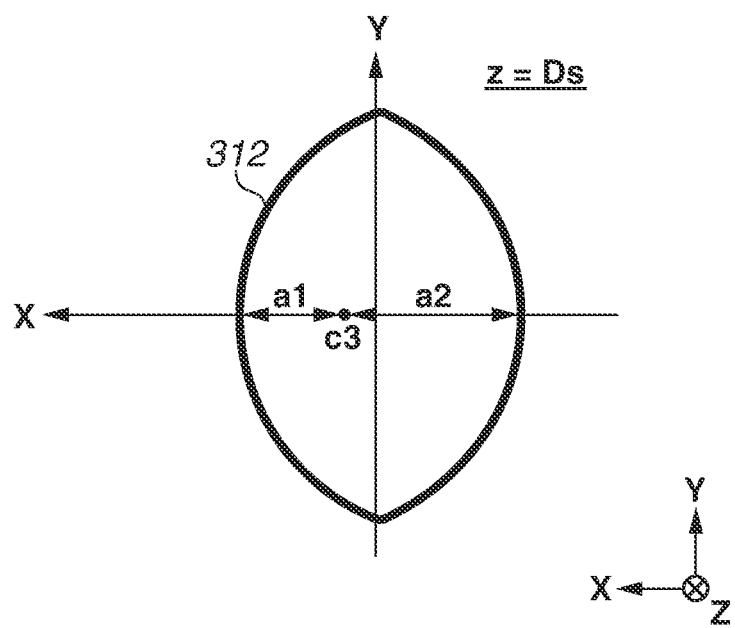
FIG. 7 is a schematic relationship diagram in a case where aperture information in each exemplary embodiment is expressed by information about distances from the center position of a diaphragm.

FIG. 7 illustrates a behavior in which aperture information is expressed as information about distances from the center position of the diaphragm 102 with respect to the aperture shape 312. In FIG. 7, c3 denotes the center position of the diaphragm 102, and a1 and a2 denote distances from the center position of the diaphragm 102 (aperture information). The distances a1 and a2 are able to be calculated from the position c1, radius r1, and center position c3 and the position c2, radius r2, and center position c3 according to the following formulae (5A) and (5B), respectively. In this way, storing the position c1 and radius r1 and the position c2 and radius r2 as the distances a1 and a2 enables reducing the required storage capacity of the lens memory 118.

$$a1 = r1 - (c1 - c3) \quad (5A)$$

$$a2 = r2 + (c2 - c3) \quad (5B)$$

In the second exemplary embodiment, the distances a1 and a2 are calculated from the position c1, radius r1, and center position c3 and the position c2, radius r2, and center position c3, but can be calculated directly from the aperture information and the center position c3. Moreover, in the second exemplary embodiment, the aperture information is previously stored in the lens memory 118 and is then acquired therefrom, but can be previously stored in the memory 128 and is then acquired therefrom. Moreover, the aperture shape can be previously stored on a network, aperture information can be calculated according to the calculation method described in the second exemplary embodiment, and the calculated aperture information can be acquired by performing communication with the lens unit 100 or the camera body 120. Moreover, the center position c3 of the diaphragm 102 approximately coincides with the optical axis OA, and, therefore, can be omitted as zero. Furthermore, while, in the second exemplary embodiment, an example in which parameters are set based on the diaphragm 102 has been described, parameters can be set based on the exit pupil of the imaging optical system or the sensor entrance pupil of the image sensor 122.

With the above-described configuration, it becomes possible to express the aperture shape with a simple configuration without decreasing the accuracy of aperture information.

Next, a third exemplary embodiment of the present disclosure is described. In the third exemplary embodiment, a method of acquiring aperture information in a case where a converter lens unit is mounted on the camera described in the first exemplary embodiment is described.

Figure 8:
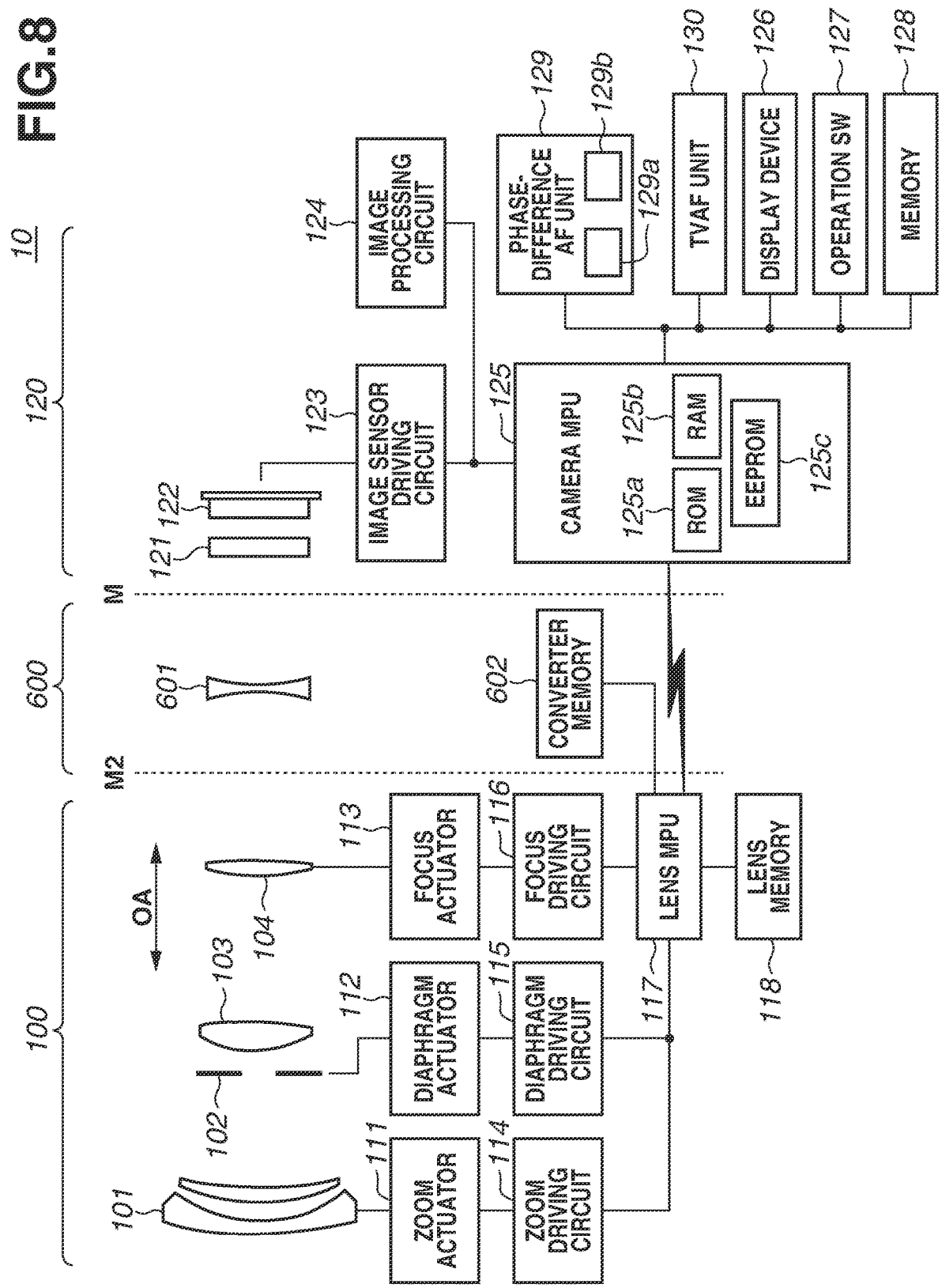
FIG. 8 is a block diagram of an imaging apparatus with a converter lens mounted between a lens unit and a camera body in each exemplary embodiment.

FIG. 8 is a block diagram illustrating a functional configuration example of a digital camera serving as an example of an imaging apparatus according to the third exemplary embodiment. A difference from the configuration illustrated in the block diagram of FIG. 1 is that a converter lens unit 600 is added between the lens unit 100 and the camera body 120. Furthermore, constituent elements similar to those illustrated in FIG. 1 are assigned the respective same reference numerals, and are omitted from description here. Furthermore, while, in the third exemplary embodiment, an example in which the converter lens unit 600 is mounted between the lens unit 100 and the camera body 120 is described, the third exemplary embodiment is not limited to this example. For example, the converter lens unit 600 can be configured to be mounted in front of the lens unit 100, or a plurality of converter lens units 600 can be configured to be mounted. Alternatively, the converter lens unit 600 can be included in the lens unit 100 and can be configured to be able to be inserted into and extracted from the optical path by an operation member provided in the lens unit 100 being operated.

The converter lens unit 600, which includes a converter lens 601 and a converter memory 602, is an imaging lens that changes the focal length of the lens unit 100, which forms the optical image of a subject. Furthermore, in the following description, for the purpose of distinction from the converter lens unit 600, the lens unit 100 is sometimes referred to as a "master lens 100". When the converter lens unit 600 is mounted, the first lens group 101, the second lens group 103, and the converter lens 601 operate to implement a zoom function. The converter memory 602 previously stores optical information required for automatic focus adjustment. The camera MPU 125 controls an operation of the master lens 100 by executing programs stored in, for example, a built-in non-volatile memory, the lens memory 118, and the converter memory 602.

The lens unit 100 and the camera body 120 are able to communicate with each other via the mount M as with the first exemplary embodiment. Specifically, a mount M, via which the converter lens unit 600 is connected to the camera body 120, and a mount M2, via which the lens unit 100 is connected to the converter lens unit 600, have respective corresponding electrical contacts. Therefore, the camera body 120 is able to communicate with the lens unit 100 with use of the same communication method as in a case where the converter lens unit 600 is not mounted. Furthermore, for the purpose of controlling such communication, a configuration in which, for example, a dedicated CPU is provided in the converter lens unit 600 can be employed. This enables the converter lens unit 600 to communicate with the lens MPU 117 without going through the camera MPU 125.

<Aperture Information Acquisition Flow>

The flow of aperture information acquisition in the third exemplary embodiment is described as follows. In the third exemplary embodiment, the aperture information is stored in the lens memory 118, and the lens MPU 117 transmits the aperture information to the camera MPU 125 in response to a request from the camera MPU 125. While, in the third exemplary embodiment, an example in which the aperture information is stored in the lens memory 118 is described, the aperture information to be acquired can be stored in the memory 128 or the converter memory 602. Moreover, the first aperture information can be stored in the lens memory 118 and the second aperture information can be stored in the converter memory 602.

Figure 9:
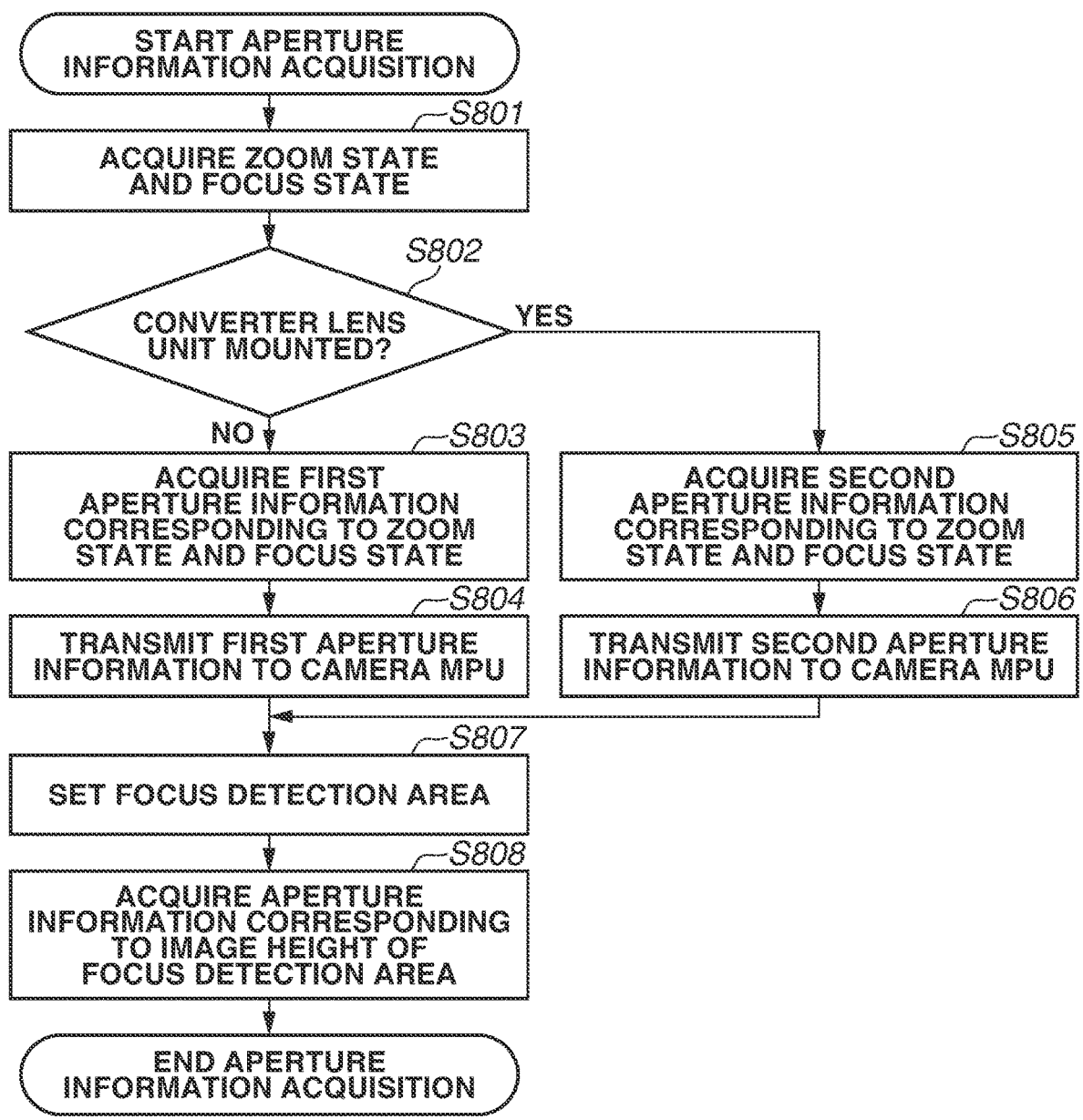
FIG. 9 is a flowchart for aperture information acquisition in a third exemplary embodiment.

FIG. 9 is a flowchart of aperture information acquisition in the third exemplary embodiment. Furthermore, processing operations illustrated in FIG. 9 are performed by the lens MPU 117, the lens memory 118, and the camera MPU 125.

First, in step S801 illustrated in FIG. 9, the lens MPU 117 acquires the current zoom state ZS from the zoom driving circuit 114 and acquires the current focus state FS from the focus driving circuit 116.

Next, in step S802, the lens MPU 117 determines the presence or absence of mounting of the converter lens unit 600. Here, the lens MPU 117 determines the presence or absence of mounting by performing communication with the converter lens unit 600 via the mount M2, but can be configured to be able to determine the presence or absence of mounting by checking voltages of, for example, terminals provided in the mount M2. Moreover, the camera MPU 125 can communicate the presence or absence of mounting to the lens MPU 117. Moreover, the lens MPU 117 can determine the presence or absence of mounting based on a user's operation on the operation SW 127 provided on the camera body 120. Here, if it is determined that the converter lens unit 600 is not mounted (NO in step S802), the processing proceeds to step S803, and, if it is determined that the converter lens unit 600 is mounted (YES in step S802), the processing proceeds to step S805.

Next, a case where the converter lens unit 600 is not mounted is described. In step S803, the lens MPU 117 acquires first aperture information corresponding to the zoom state ZS and focus state FS acquired in step S801 from the lens memory 118.

Here, the first aperture information is aperture information about the master lens 100 stored in the lens memory 118. The lens memory 118 stores pieces of first aperture information for the respective zoom states ZS, into which the zoom range is divided, for the respective focus states FS, into which the focus range is divided, and for the respective image heights, into which the image height range is divided. Therefore, in step S803, the lens MPU 117 calculates and acquires aperture information corresponding to the current zoom state ZS and focus state FS by performing linear interpolation based on aperture information corresponding to nearby states. The image height is calculated and acquired by the camera MPU 125 as described below. While, in the third exemplary embodiment, aperture information in the current state is acquired by performing linear interpolation, aperture information in the nearest state can be acquired as aperture information in the current state. Details of the aperture information are similar to those described in the first exemplary embodiment, and are, therefore, omitted from description.

In step S804, as with step S203 illustrated in FIG. 3B, the lens MPU 117 transmits the first aperture information acquired in step S803 to the camera MPU 125. Then, the processing proceeds to step S807. The first aperture information to be transmitted in step S804 includes aperture information about a plurality of image heights.

Next, processing operations performed in a case where the converter lens unit 600 is mounted are described. In step S805 illustrated in FIG. 9, the lens MPU 117 acquires second aperture information corresponding to the zoom state ZS and focus state FS acquired in step S801 from the lens memory 118. The second aperture information is aperture information stored in the lens memory 118 and obtained in a state in which the converter lens unit 600 is mounted on the master lens 100.

The lens memory 118 stores pieces of second aperture information for the respective zoom states ZS, into which the zoom range is divided, for the respective focus states FS, into which the focus range is divided, and for the respective image heights, into which the image height range is divided. Therefore, in step S805, the lens MPU 117 calculates and acquires aperture information corresponding to the current zoom state ZS and focus state FS by performing linear interpolation based on aperture information corresponding to nearby states. The image height is calculated and acquired by the camera MPU 125 as described below.

Figure 10:
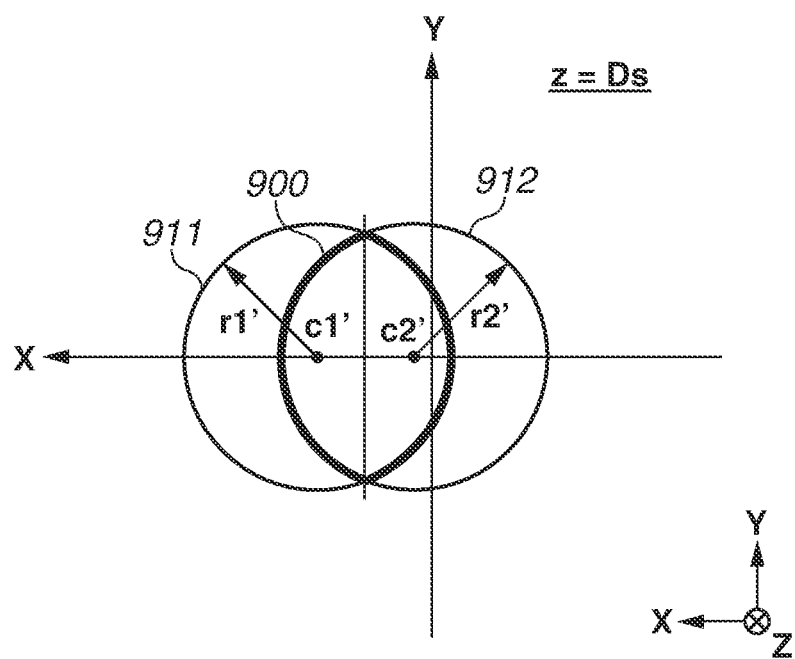
FIG. 10 is a schematic explanatory diagram of aperture information which is obtained when a converter lens unit is mounted on a master lens unit in each exemplary embodiment.

FIG. 10 is a schematic explanatory diagram illustrating an aperture shape and aperture information obtained in a state in which the converter lens unit 600 is mounted on the master lens 100. A curved line 900 illustrated in FIG. 10 represents an aperture shape obtained in a state in which the converter lens unit 600 is mounted on the master lens 100. Aperture information 911 is expressed by a position c1' and a radius r1', and aperture information 912 is expressed by a position c2' and a radius r2'. Pieces of aperture information obtained in a state in which the converter lens unit 600 is mounted on the master lens 100 differ in position and size from the pieces of aperture information 411 and 412 obtained in a state in which only the master lens 100 is mounted on the camera body 120.

Next, in step S806 illustrated in FIG. 9, the lens MPU 117 transmits the second aperture information acquired in step S805 to the camera MPU 125. Then, the processing proceeds to step S807. The second aperture information to be transmitted in step S806 includes aperture information about a plurality of image heights.

In the third exemplary embodiment, the lens memory 118 stores pieces of first aperture information and pieces of second aperture information for the respective zoom states ZS, into which the zoom range is divided, for the respective focus states FS, into which the focus range is divided, and for the respective image heights, into which the image height range is divided. Then, the lens MPU 117 determines which of the first aperture information and the second aperture information to transmit according to the result determined in step S802 illustrated in FIG. 9. Furthermore, the second aperture information does not necessarily need to be stored in the lens memory 118, but can be obtained by, for example, calculation from the first aperture information. For example, in a case where the converter lens unit 600 is mounted, the second aperture information can be obtained by converting the first aperture information in consideration of the zoom state ZS and focus state FS acquired in step S801 and optical characteristics of the converter lens unit 600. Moreover, the second aperture information can be obtained by using a conversion equation which, for example, multiplies the first aperture information in the master lens 100 by a predetermined coefficient.

Next, in step S807, the camera MPU 125 sets a focus detection area, which is a target for focus adjustment, from within the effective pixel region of the image sensor 122. Then, in step S808, the camera MPU 125 acquires aperture information about the set image height from the first aperture information or second aperture information received in step S804 or step S806 based on the image height of the focus detection area set in step S807. Processing operations in step S807 and step S808 respectively correspond to those in step S204 and step S205 illustrated in FIG. 3B, and, therefore, details thereof are omitted from description.

While, in the description of the third exemplary embodiment, it is assumed that aperture information is used for focus detection, aperture information can be used for, for example, exposure adjustment or image processing. In that case, as with the third exemplary embodiment, the camera MPU 125 also sets a processing region corresponding to an image height on which processing is intended to be performed in step S807, and acquires aperture information corresponding to the processing region in step S808.

While, in the third exemplary embodiment, an example in which aperture information is previously stored in the lens memory 118 (storage unit) has been described, aperture information can be previously stored in the memory 128 or the converter memory 602 and acquired therefrom. Moreover, the first aperture information can be previously stored in the lens memory 118 and the second aperture information can be previously stored in the converter memory 602. Moreover, a first aperture shape and a second aperture shape can be previously stored on a network, aperture information can be calculated according to the calculation method described in the first exemplary embodiment, and the calculated aperture information can be acquired by performing communication with the lens unit 100 or the camera body 120. While, in the description of the third exemplary embodiment, it is assumed that aperture information is used for focus detection, aperture information can be used for, for example, exposure adjustment or image processing, and in that case, as with the third exemplary embodiment, the camera MPU 125 can be configured to acquire aperture information corresponding to an image height on which processing is intended to be performed.

With the above-described configuration, even in a case where the converter lens unit 600 is mounted, it becomes possible to express the aperture shape with a simple configuration without decreasing the accuracy of aperture information.

Moreover, while, in the third exemplary embodiment, it has been described that the converter lens unit 600 is configured to include an optical system which implements a zoom function, the third exemplary embodiment can be applied to any configuration which varies an optical condition of the lens unit 100. For example, the present exemplary embodiment is adaptable to a case where a mount adapter, which is used to adjust the flange back distance, or an adapter, which enables inserting and removing an optical filter, is mounted.

Next, a fourth exemplary embodiment of the present disclosure is described. In the fourth exemplary embodiment, the flow of aperture information acquisition is different from the flow of aperture information acquisition described in the third exemplary embodiment. Specifically, while, in the third exemplary embodiment, the second aperture information previously stored in the lens memory 118 is acquired, in the fourth exemplary embodiment, the second aperture information is acquired by the calculation for converting the first aperture information. The other configuration and operation in the fourth exemplary embodiment are similar to those in the third exemplary embodiment, and are, therefore, omitted from description.

<Aperture Information Acquisition Flow>

The flow of aperture information acquisition in the fourth exemplary embodiment is described as follows. In the fourth exemplary embodiment, the aperture information is stored in the lens memory 118 (storage unit), and the lens MPU 117 (transmission unit) transmits the aperture information to the camera MPU 125 in response to a request from the camera MPU 125. While, in the fourth exemplary embodiment, an example in which the aperture information is stored in the lens memory 118 (storage unit) is described, the aperture information to be acquired can be stored in the memory 128 or the converter memory 602.

Figure 11:
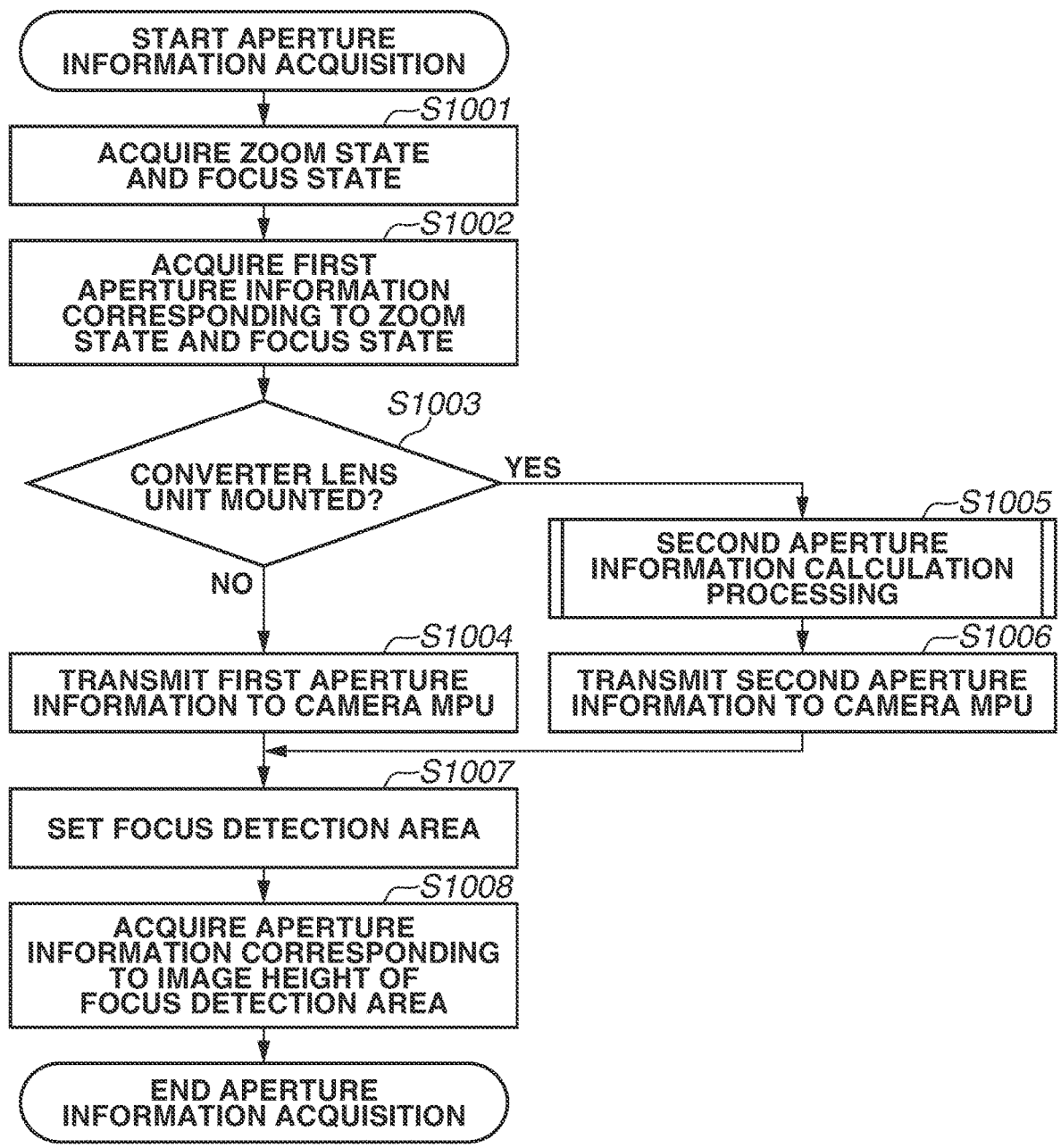
FIG. 11 is a flowchart for aperture information acquisition in a fourth exemplary embodiment.

FIG. 11 is a flowchart of aperture information acquisition in the fourth exemplary embodiment. Furthermore, processing operations illustrated in FIG. 11 are performed by the lens MPU 117, the lens memory 118, and the camera MPU 125.

First, processing operations in step S1001 to step S1004 illustrated in FIG. 11 respectively correspond to those in step S801 to step S804 illustrated in FIG. 9, and are, therefore, omitted from description. Moreover, processing operations in step S1007 and step S1008 illustrated in FIG. 11 respectively correspond to those in step S807 and step S808 illustrated in FIG. 9, and are, therefore, omitted from description.

Here, processing operations performed in a case where, in step S1003, it is determined that the converter lens unit 600 is mounted (YES in step S1003) are described. In step S1005 illustrated in FIG. 11, the lens MPU 117 calculates second aperture information. Then, the processing proceeds to step S1006. The second aperture information calculation processing is described below.

Next, in step S1006 illustrated in FIG. 11, the lens MPU 117 transmits the second aperture information calculated in step S1005 to the camera MPU 125. The second aperture information to be transmitted in step S1006 includes aperture information about a plurality of image heights.

While, in the description of the fourth exemplary embodiment, it is assumed that aperture information is used for focus detection, aperture information can be used for, for example, exposure adjustment or image processing. In that case, as with the fourth exemplary embodiment, the camera MPU 125 also sets a processing region corresponding to an image height on which processing is intended to be performed in step S1007, and acquires aperture information corresponding to the processing region in step S1008.

<Second Aperture Information Calculation Processing>

Details of the second aperture information calculation processing in step S1005 illustrated in FIG. 11 are described as follows.

Figure 12:
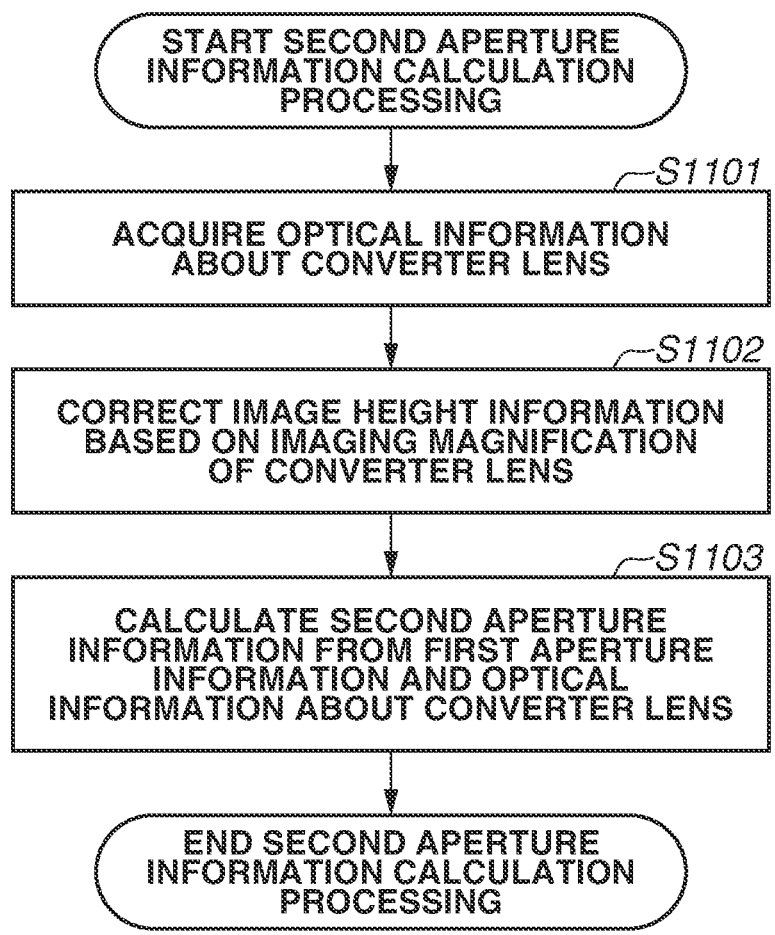
FIG. 12 is a flowchart for second aperture information calculation processing in the fourth exemplary embodiment.

FIG. 12 is a flowchart illustrating second aperture information calculation processing in the fourth exemplary embodiment. Furthermore, processing operations illustrated in FIG. 12 are performed by the lens MPU 117, the lens memory 118, and the converter memory 602.

First, in step S1101 illustrated in FIG. 12, the lens MPU 117 acquires optical information about the converter lens 601 from the converter memory 602. The optical information includes, for example, the magnification T, the rear principal point position P1, the front principal point position P2, and the focal length f of the converter lens 601 and the physical length d of the converter lens unit 600. Additionally, the lens MPU 117 can acquire identifier (ID) information about the converter lens 601, adjustment value information, and information about, for example, a firmware version.

Next, in step S1102 illustrated in FIG. 12, the lens MPU 117 corrects image height information based on the imaging magnification T of the converter lens 601 acquired in step S1101. This is because, depending on the presence and absence of mounting of the converter lens unit 600, light fluxes passing through different regions of the master lens 100 are received as the same image height on the imaging plane. First, the lens MPU 117 sets an image height magnification T1, which indicates a movement rate of image height as viewed from the master lens 100 due to the mounting of the converter lens unit 600. Here, the image height magnification T1 can be set as T1=T, or can be set as T1=T×Co1, which is a value obtained by multiplying the imaging magnification T of the converter lens 601 by a predetermined magnification Co1. In that case, it is favorable that the predetermined magnification Co1 is a value previously obtained from the imaging magnification T defined as design information in consideration of manufacturing error. Moreover, the movement rate of image height corresponding to the imaging magnification T or characteristics of the converter lens 601 can be previously stored in the converter memory 602, the lens memory 118, or the RAM 125b, and, then, the read-out information can be set as the image height magnification T1.

In a subsequent processing operation (in step S1103), second aperture information, which is aperture information obtained in a state in which the converter lens unit 600 is mounted on the master lens 100, is calculated from the first aperture information, which is aperture information about the master lens 100, acquired in step S1002. Therefore, image height information (x, y) about the master lens 100 is required to be multiplied by the image height magnification T1. For example, with regard to light made incident at the image height (x, y) on the imaging plane before mounting of the converter lens unit 600, the image height of light made incident on the imaging plane shifts when the converter lens unit 600 is mounted. When the image height at which light is made incident in a case where the converter lens unit 600 has been mounted is denoted by (xt, yt), the relationship thereof with the image height (x, y) obtained before mounting of the converter lens unit 600 becomes as follows.

$$(xt, yt) = (x \times T1, y \times T1) \qquad (6)$$

Therefore, it is necessary to correct the image height information (x, y) about the master lens 100 to the image height information (xt, yt) obtained in a case where the converter lens unit 600 has been mounted.

Next, in step S1103 illustrated in FIG. 12, the lens MPU 117 calculates second aperture information from the first aperture information acquired in step S1002. In this calculation, the lens MPU 117 uses the rear principal point position P1, the front principal point position P2, and the focal length f of the converter lens 601 and the physical length d of the converter lens unit 600 acquired in step S1101.

Figure 13:
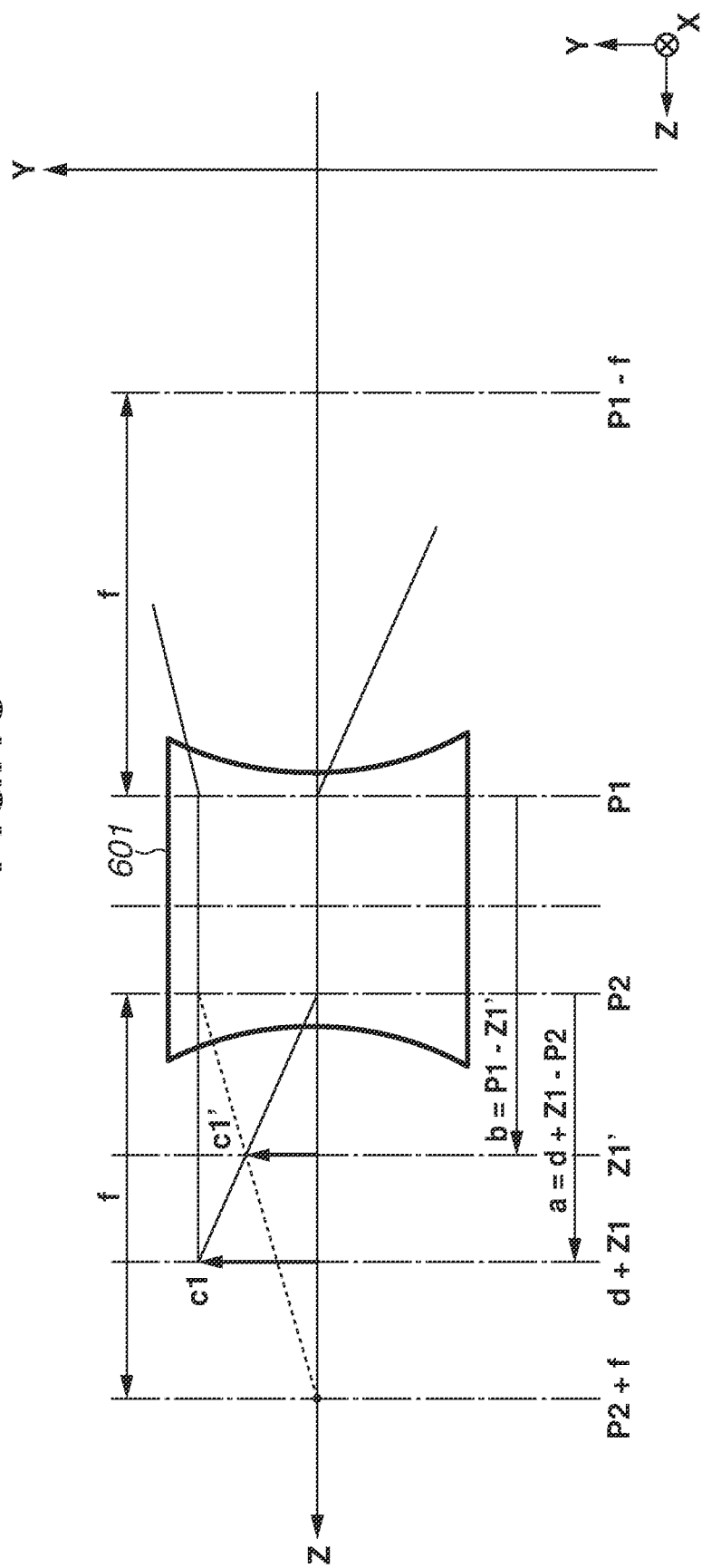
FIG. 13 is a schematic explanatory diagram of optical information about a converter lens in the fourth exemplary embodiment.

FIG. 13 illustrates a relationship between the converter lens 601, the rear principal point position P1, the front principal point position P2, the focal length f, the physical length d of the converter lens unit 600. Additionally, FIG. 13 also illustrates a relationship between the Y direction position c1 and the Z direction position Z1 of the first aperture information and the Y direction position c1' and the Z direction position Z1' of the second aperture information as calculated. When the distance from the front principal point to the Z direction position of the aperture information of the master lens 100 is denoted by a and the distance from the rear principal point to the Z direction position of the aperture information obtained in a case where the converter lens unit 600 has been mounted is denoted by b, the distances a and b are expressed by the following formulae (6A) and (6B).

$$a = d + Z1 - P2 \quad (6A)$$

$$b = P1 - Z1' \quad (6B)$$

When formulae (6A) and (6B) are assigned to the lens formula (7A), the Z direction position Z1' of the second aperture information is calculated as expressed by the following formula (7B). In the fourth exemplary embodiment, calculation is performed with use of the formula (7A), in which the focal length f is supposed to be greater than 0 (f>0) and the converter lens 601 being a concave lens is taken into consideration.

$$\frac{1}{a} + \frac{1}{b} = -\frac{1}{f} \quad (7A)$$

$$Z1' = P1 + \frac{f(Z1 + d - P2)}{f + Z1 + d - P2} \quad (7B)$$

Moreover, the Y direction position c1' of the second aperture information is calculated from a relationship between the distances a and b and the magnification, as expressed by the following formula (8).

$$c1' = c1\left|\frac{b}{a}\right| = c1\left|\frac{f}{f + d + Z1 - P2}\right| \quad (8)$$

While, in the fourth exemplary embodiment, the position c1' is calculated from a relationship between the distances a and b and the magnification, the position c1' can be calculated with use of the magnification T of the converter lens 601. Moreover, while, in the fourth exemplary embodiment, image height correction is performed by storing and then acquiring the magnification T of the converter lens 601 as optical information about the converter lens 601, image height correction can be performed based on the magnification calculated from a relationship between the distances a and b without storing the magnification T of the converter lens 601.

Moreover, in the fourth exemplary embodiment, the positions c1' and Z1' are calculated by storing and then acquiring the rear principal point position P1 and front principal point position P2 of the converter lens 601 as optical information about the converter lens 601. However, the principal point interval can be set to 0, so that "P1=P2" can be used to simplify calculation and reduce the required storage capacity.

While, in the fourth exemplary embodiment, an example in which the first aperture information is stored in the lens memory 118 (storage unit) has been described, the first aperture information can be stored in and then acquired from the memory 128 or the converter memory 602. Moreover, while, in the fourth exemplary embodiment, the second aperture information is calculated by the lens MPU 117, the first aperture information and the optical information about the converter lens 601 can be transmitted to the camera body 120 and the second aperture information can be calculated by the camera MPU 125. Moreover, in the fourth exemplary embodiment, the optical information about the converter lens 601 is stored in and then acquired from the converter memory 602, but can be stored in the memory 128 and then acquired therefrom when the converter lens unit 600 is mounted. Moreover, the first aperture shape can be previously stored on a network, and the first shape information can be calculated by the calculation method described in the first exemplary embodiment and can be acquired by performing communication with the lens unit 100 or the camera body 120.

With the above-described configuration, even in a case where the converter lens unit 600 is mounted, it becomes possible to express the aperture shape with a simple configuration according to the mounting state without decreasing the accuracy of aperture information. Moreover, calculating aperture information obtained in a case where the converter lens unit 600 has been mounted from the optical information about the converter lens unit 600 and the aperture information about the master lens 100 enables reducing the required storage capacity without decreasing the accuracy of aperture information.

Next, a fifth exemplary embodiment of the present disclosure is described. In the above-described first exemplary embodiment, aperture information obtained by the lens members limiting a light flux in a full aperture state of the diaphragm 102 has been described. On the other hand, in the lens unit 100, when the aperture of the diaphragm 102 is reduced, a transmitted light flux would be limited only by the diaphragm 102. In the fifth exemplary embodiment, an imaging optical system in a case where the aperture of the diaphragm has been reduced to such a degree that a light flux is not limited by the lens members is considered. The fifth exemplary embodiment is characterized by storing information about a diaphragm shape included in the lens unit 100 and transmitting such information to the camera body 120.

Figure 14:
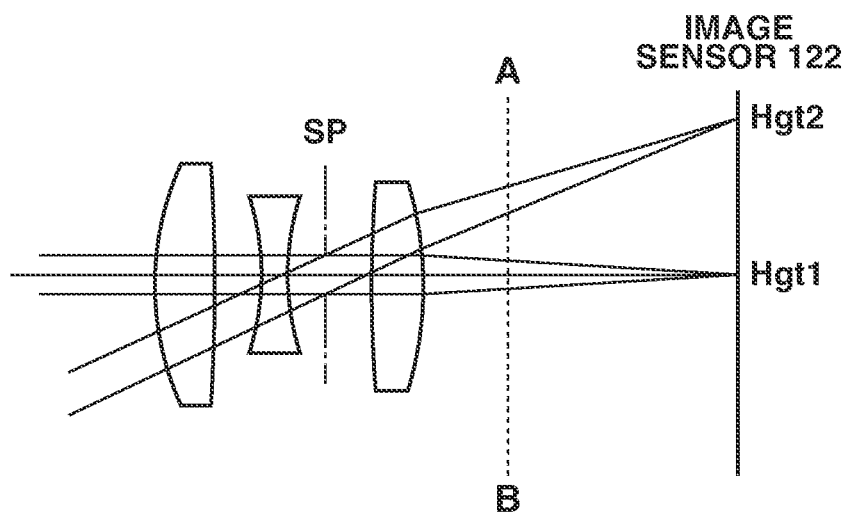
FIG. 14 is an outline sectional schematic view of an imaging optical system in a fifth exemplary embodiment.

FIG. 14 is a schematic sectional view illustrating a relationship between the lens unit 100 and the camera body 120 in the fifth exemplary embodiment. In FIG. 14, graphics including curved lines represent cross-sections of lenses, and a line segment indicated by a dashed-dotted line represents a diaphragm position SP. Moreover, a central image height in the image sensor 122 is denoted by Hgt1 and a high image height therein is denoted by Hgt2, and diagrams of rays of light focusing on the central image height Hgt1 and the high image height Hgt2 are indicated by solid lines. In both diagrams of rays of light, at the diaphragm position SP, a light flux having the same aperture shape as that of the diaphragm passes. Specifically, if the diaphragm shape is circular, a light flux having a circular aperture shape passes irrespective of image heights. However, the diaphragm shape in a case where a light flux passing through the diaphragm is viewed from the image sensor 122 (exit pupil shape) may be viewed as being different depending on image heights. In particular, such a phenomenon occurs notably in a case where the magnification of an optical member (lens) located nearer to the image sensor 122 than the diaphragm is large. In particular, in order to minimize or shorten the lens unit 100, it is necessary to increase the magnification of each lens. In such a case, a variation of the exit pupil shape as viewed from the image sensor 122 becomes conspicuous.

Figure 15:
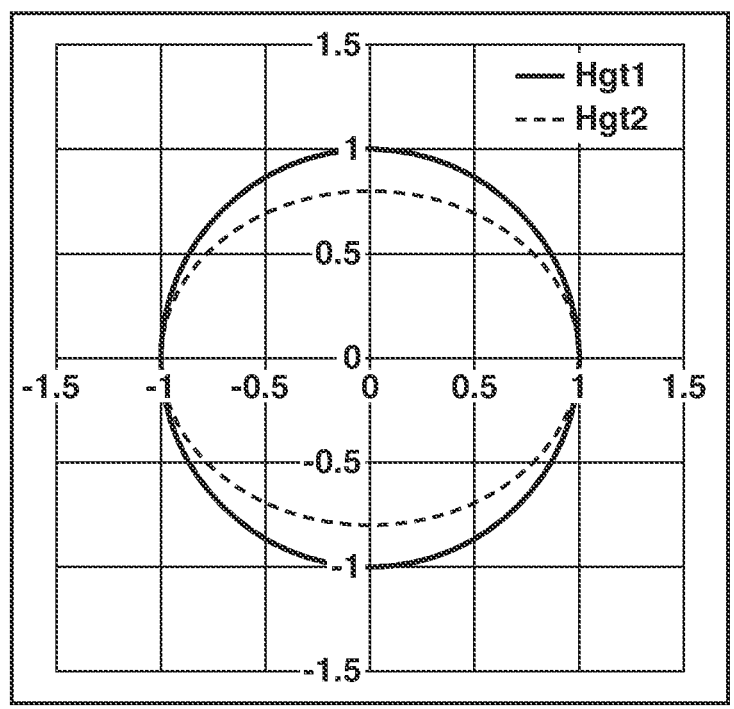
FIG. 15 is a comparative diagram of exit pupil shapes in the fifth exemplary embodiment.

FIG. 15 illustrates exit pupil shapes obtained at a dashed line A-B illustrated in FIG. 14. For ease of explanation, normalization is performed with the exit pupil shape for the central image height Hgt1, and the exit pupil shapes are illustrated with the centers of the respective light fluxes aligned with each other. A circle indicated by a solid line represents the exit pupil shape for the central image height Hgt1, and a circle indicated by a dotted line represents the exit pupil shape for the high image height Hgt2. As illustrated in FIG. 15, the exit pupil shape for the central image height Hgt1 is circular as with the diaphragm shape. On the other hand, the exit pupil shape for the high image height Hgt2 is ellipsoidal.

In the fifth exemplary embodiment, optical information which the lens memory 118 stores includes, as information about the exit pupil shape, a variation of the exit pupil shape corresponding to distances from the optical axis center (image heights or coordinates).

An example of a variation of the exit pupil shape corresponding to distances from the optical axis center includes a variation of the size of the exit pupil. A value obtained by normalizing an area of the exit pupil corresponding to a distance based on the size of the exit pupil for the central image height Hgt1 illustrated in FIG. 15 can be set as information about the exit pupil shape. More specifically, an example of an area variation of the exit pupil corresponding to the distance r from the optical axis center is shown in Table 1.

TABLE 1

| | r | | | | |
|---|---|---|---|---|---|
| | 0 | 5 | 10 | 15 | 20 |
| Area ratio | 1 | 0.95 | 0.9 | 0.85 | 0.8 |

Moreover, it is favorable that an example of a variation of the exit pupil shape corresponding to distances from the optical axis center is information about a variation of the exit pupil shape corresponding to the distance from the optical axis center in at least one of the radial direction and circumferential direction. Here, the variation of the exit pupil shape in the radial direction is equivalent to a variation of the diameter of the exit pupil in the radial direction. Moreover, the variation of the exit pupil shape in the circumferential direction is equivalent to a variation of the diameter of the exit pupil in the circumferential direction. When normalization is performed with the diameter in the radial direction or the diameter in the circumferential direction of the exit pupil for the central image height Hgt1, a variation of the diameter of the exit pupil shape corresponding to the distance from the optical axis center is able to be expressed. Moreover, if an elliptical shape is premised, when the optical information includes information about a variation of the diameter in the radial direction or circumferential direction corresponding to the distance from the optical axis center, it becomes possible to estimate a light flux passage region. Furthermore, in a case where, as illustrated in FIG. 15, only a variation of the diameter in the radial direction is seen, the optical information only needs to include only a variation of the diameter in the radial direction.

Using the fifth exemplary embodiment enables expressing a highly accurate exit pupil shape, and combining an imaging optical system and an imaging apparatus according to the fifth exemplary embodiment enables performing highly accurate focus detection. Furthermore, while, in the fifth exemplary embodiment, information about the exit pupil shape of the lens unit 100 is retained in the lens unit 100, the information about the exit pupil shape can be stored in the camera body 120. Associating the ID of the lens unit 100 with the information about the exit pupil shape stored in the camera body 120 enables the camera body 120 to utilize the information about the exit pupil shape of the lens unit 100.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2018-125508 filed Jun. 29, 2018, which is hereby incorporated by reference herein in its entirety.

What is claimed is:

1. A lens apparatus comprising:
an imaging optical system;
a storage unit configured to store aperture information which is information about a shape of an aperture which defines an outer edge of a light flux passing through the imaging optical system; and
a transmission unit configured to transmit the aperture information to an imaging apparatus,
wherein the aperture information is information in which fitting is performed on the shape of the aperture based on at least one of a width of the shape of the aperture, an area thereof, a changing point of a radius of curvature thereof and a discrete point of secondary differentiation of a distance from a predetermined position thereof.

2. The lens apparatus according to claim 1, wherein the aperture information is information about a center position and a size when fitting is performed on the shape of the aperture on a predetermined position on an optical axis of the imaging optical system.

3. The lens apparatus according to claim 1, wherein the aperture information is information about a distance from a center position of a diaphragm of the imaging optical system.

4. The lens apparatus according to claim 1, wherein the transmission unit transmits the aperture information to the imaging apparatus according to a state of the imaging optical system.

5. The lens apparatus according to claim 1, wherein the aperture information is information in which fitting is performed in a manner such that an error of the width of the shape of the aperture is minimum.

6. The lens apparatus according to claim 1, wherein the aperture information is information in which fitting is performed in a manner such that an error of the area of the shape of the aperture is minimum.

7. The lens apparatus according to claim 1, wherein the aperture information is information in which fitting is performed in a range calculated based on the changing point of the radius of curvature.

8. The lens apparatus according to claim 1, wherein the aperture information is information in which fitting is performed in a range calculated based on the discrete point of the secondary differentiation of the distance from the predetermined position.

9. The lens apparatus according to claim 1, wherein the transmission unit transmits the aperture information to the imaging apparatus corresponding to at least one of a zoom state, a focus state and an image height designated by the imaging apparatus.

10. A method for calculating aperture information about an imaging optical system, the method comprising:

calculating the aperture information which is information about a shape of an aperture which defines an outer edge of a light flux passing through the imaging optical system, and wherein the aperture information is information which performs fitting on the shape of the aperture based on at least one of a width of the shape of the aperture, an area thereof, a changing point of a radius of curvature thereof and a discrete point of secondary differentiation of a distance from a predetermined position thereof.

11. The method according to claim 10, wherein the aperture information is information about a center position and a size.

12. The method according to claim 10, wherein the aperture information is information about a distance from a center position of a diaphragm of the imaging optical system.

13. A non-transitory computer-readable storage medium, which stores a computer program for causing a computer to execute a method for calculating aperture information about an imaging optical system, the method comprising:

calculating the aperture information which is information about a shape of an aperture which defines an outer edge of a light flux passing through the imaging optical system, wherein the aperture information is information which performs fitting on the shape of the aperture based on at least one of a width of the shape of the aperture, an area thereof, a changing point of a radius of curvature thereof and a discrete point of secondary differentiation of a distance from a predetermined position thereof.

14. The non-transitory computer-readable storage medium according to claim 13, wherein the aperture information is information about a center position and a size.

15. The non-transitory computer-readable storage medium according to claim 13, wherein the aperture information is information about a distance from a center position of a diaphragm of the imaging optical system.

* * * * *